United States Patent [19]

Uetani

[11] Patent Number: 5,163,103

[45] Date of Patent: Nov. 10, 1992

[54] DISCRETE COSINE TRANSFORMING APPARATUS

[75] Inventor: Yoshiharu Uetani, Kawasaki, Japan

[73] Assignee: Kabushiki Kaisha Toshiba, Kawasaki, Japan

[21] Appl. No.: 666,208

[22] Filed: Mar. 7, 1991

Related U.S. Application Data

[62] Division of Ser. No. 458,997, Dec. 27, 1989, abandoned.

[30] Foreign Application Priority Data

| Dec. 27, 1988 | [JP] | Japan | 63-327897 |
| Jan. 10, 1989 | [JP] | Japan | 1-3565 |
| Jul. 1, 1989 | [JP] | Japan | 1-168309 |

[51] Int. Cl.⁵ ............................................. G06K 9/36
[52] U.S. Cl. .................................... 382/56; 358/133; 358/426; 364/725
[58] Field of Search .................... 382/56, 41, 43; 364/725, 726, 727, 826, 827; 358/133, 426, 261.3, 261.1

[56]        References Cited

U.S. PATENT DOCUMENTS

| 4,385,363 | 5/1983 | Widergren et al. | 364/725 |
| 4,841,464 | 6/1989 | Guichard et al. | 364/725 |
| 4,922,273 | 5/1990 | Yonekawa et al. | 382/56 |
| 4,943,855 | 7/1990 | Bheda et al. | 358/133 |
| 5,014,198 | 5/1991 | Umemura | 382/56 |
| 5,025,482 | 6/1991 | Murakami et al. | 382/56 |

Primary Examiner—Joseph Mancuso
Attorney, Agent, or Firm—Oblon, Spivak, McClelland, Maier & Neustadt

[57] ABSTRACT

A discrete cosine transforming apparatus for exercising a $2^{n+1}$th order discrete cosine transform includes a plurality of basic arithmetic circuits A including circuits for temporarily storing input data and adding the input data or subtracting the input data one from the other, and a plurality of another basic arithmetic circuits B including circuits for temporarily storing input data and adding the input data or subtracting the multiplication result data obtained by multiplying the sum or subtraction result by a multiplier that is equal to or less than the input data. The basic arithmetic circuit A is located at a first stage, and then the basic arithmetic circuit B and the arithmetic circuit A are alternately arranged, thereby to form a cascade connection of "n" stages. For the inverse transform, the same circuit arrangement as that for the cosine transform is used and the direction of a signal flow is inversed.

5 Claims, 41 Drawing Sheets

FIG. 4 (CIRCUIT B)

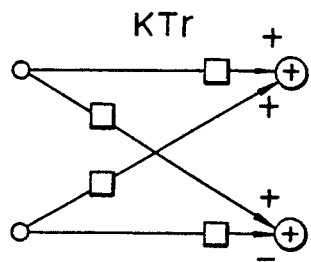
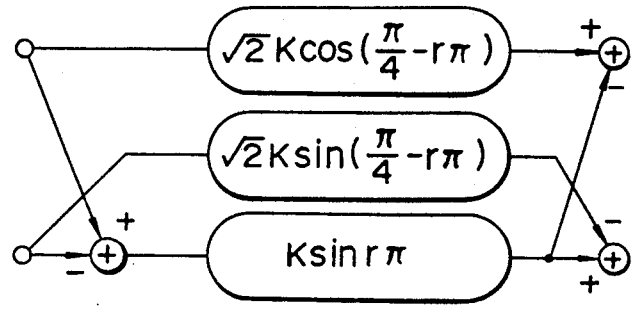
F I G. 7A  F I G. 7B
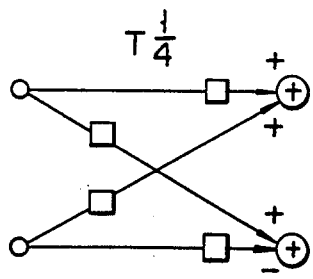
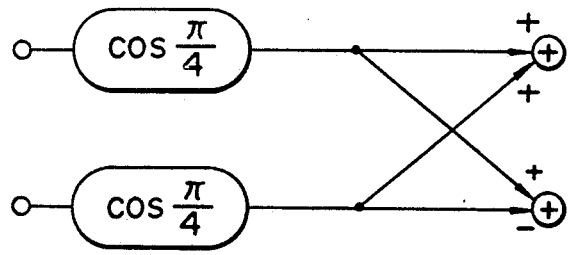
F I G. 8A  F I G. 8B

HIGH SPEED MATRIX SELECTIVE CIRCUIT

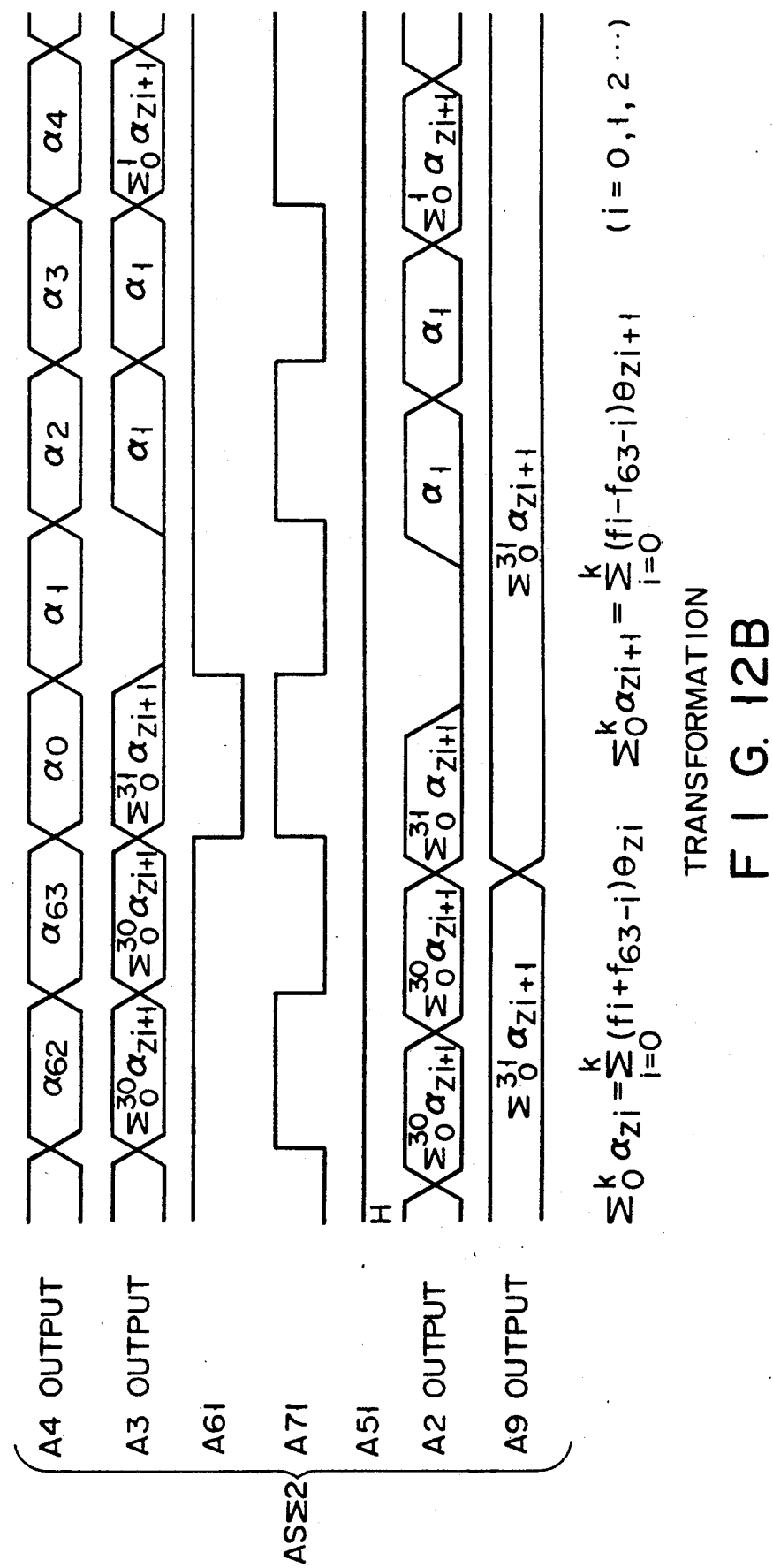

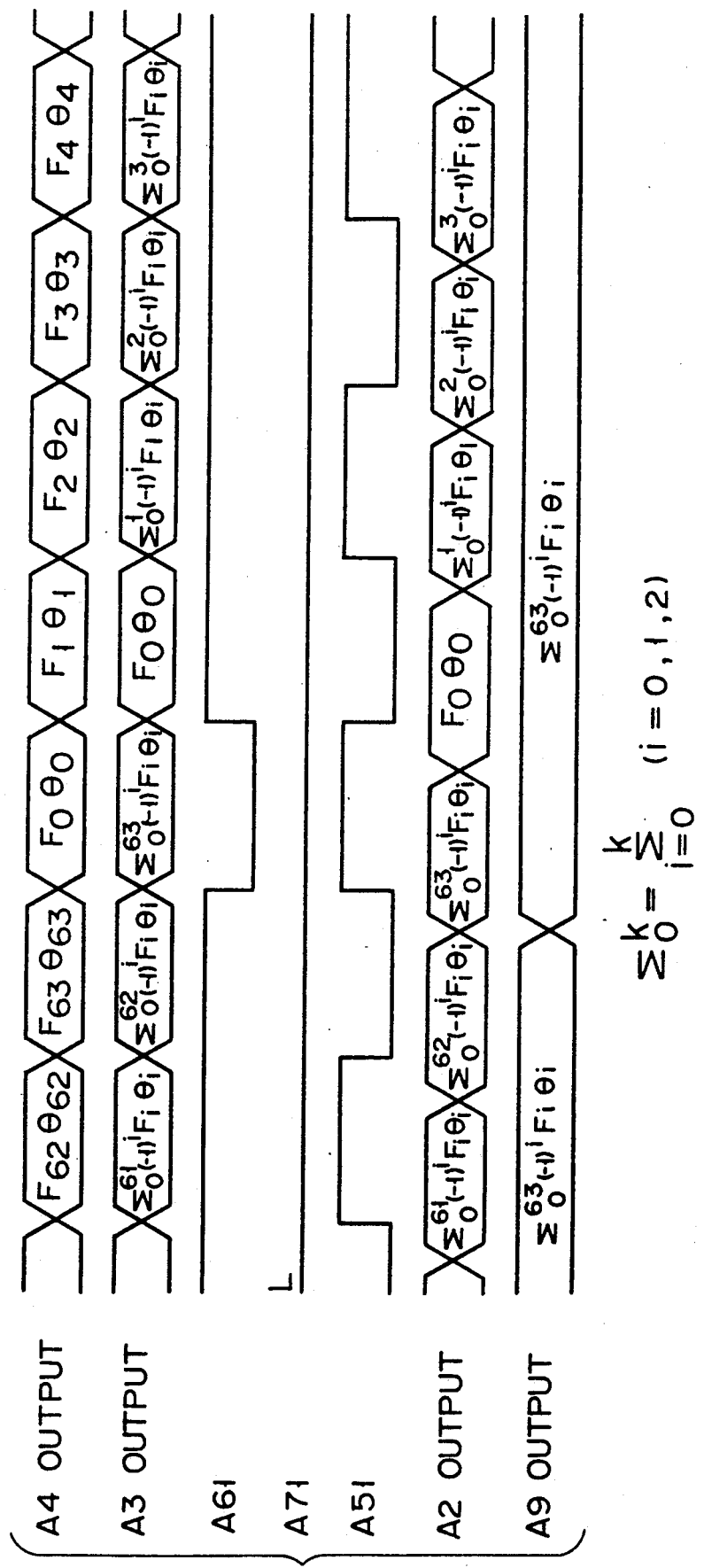

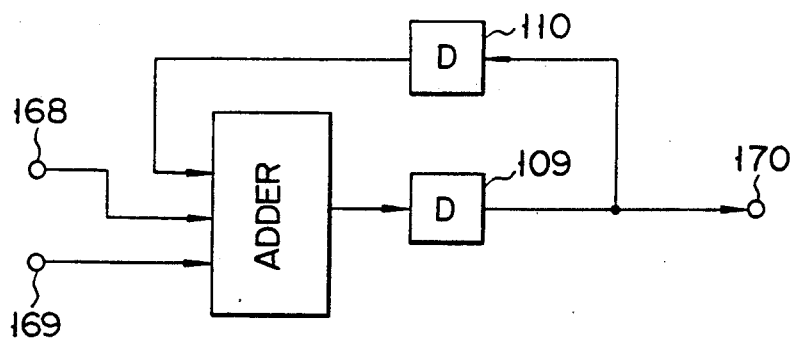
F I G. 18
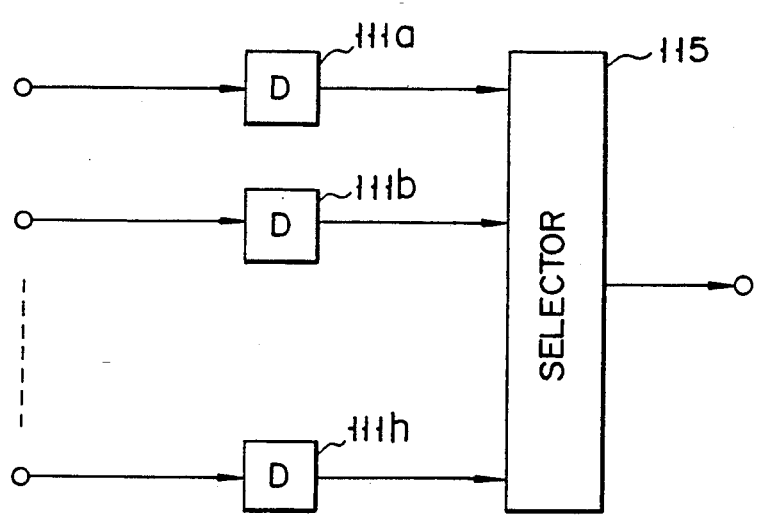
F I G. 19
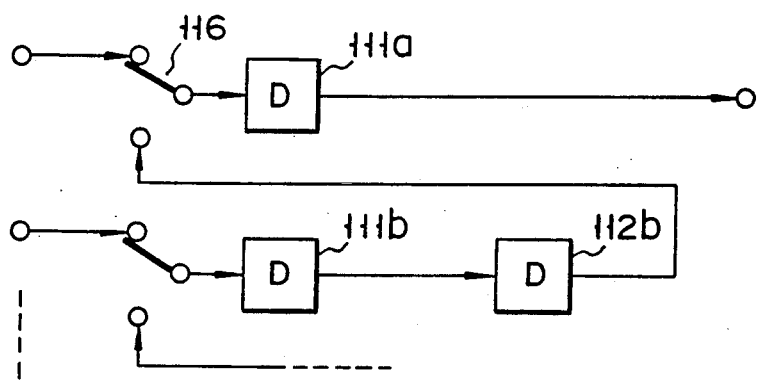
F I G. 20

| INPUT DATA / DATA LATCH OUTPUT DATA | 153a | 153b | 153c | 153d | 154a | 154b | 154c |
|---|---|---|---|---|---|---|---|
| X(3)+X(4) | $\frac{1}{2\sqrt{2}}$ | $-\frac{1}{2}\cos\frac{3}{8}\pi$ | $-\frac{1}{2}\cos\frac{1}{8}\pi$ | $\frac{1}{2\sqrt{2}}$ | 0 | 1 | 0 |
| X(3)-X(7) | $-\frac{1}{2}\cos\frac{1}{16}\pi$ | $\frac{1}{2}\cos\frac{7}{16}\pi$ | $\frac{1}{2}\cos\frac{3}{16}\pi$ | $-\frac{1}{2}\cos\frac{5}{16}\pi$ | 0 | 0 | 1 |
| X(2)+X(5) | $\frac{1}{2\sqrt{2}}$ | $\frac{1}{2}\cos\frac{1}{8}\pi$ | $-\frac{1}{2}\cos\frac{3}{8}\pi$ | $-\frac{1}{2\sqrt{2}}$ | 0 | 1 | 0 |
| X(2)-X(5) | $\frac{1}{2}\cos\frac{3}{16}\pi$ | $\frac{1}{2}\cos\frac{5}{16}\pi$ | $\frac{1}{2}\cos\frac{7}{16}\pi$ | $-\frac{1}{2}\cos\frac{1}{16}\pi$ | 0 | 0 | 1 |
| X(1)+X(6) | $\frac{1}{2\sqrt{2}}$ | $-\frac{1}{2}\cos\frac{1}{8}\pi$ | $\frac{1}{2}\cos\frac{3}{8}\pi$ | $-\frac{1}{2\sqrt{2}}$ | 0 | 1 | 0 |
| X(1)-X(6) | $-\frac{1}{2}\cos\frac{5}{16}\pi$ | $\frac{1}{2}\cos\frac{3}{8}\pi$ | $\frac{1}{2}\cos\frac{1}{16}\pi$ | $-\frac{1}{2}\cos\frac{7}{16}\pi$ | 0 | 0 | 1 |
| X(0)+X(7) | $\frac{1}{2\sqrt{2}}$ | $-\frac{1}{2}\cos\frac{3}{8}\pi$ | $\frac{1}{2}\cos\frac{1}{8}\pi$ | $\frac{1}{2\sqrt{2}}$ | 0 | 1 | 0 |
| X(0)-X(7) | $\frac{1}{2}\cos\frac{7}{16}\pi$ | $\frac{1}{2}\cos\frac{1}{16}\pi$ | $\frac{1}{2}\cos\frac{5}{16}\pi$ | $\frac{1}{2}\cos\frac{3}{16}\pi$ | 0 | 0 | 1 |

F I G. 22

| INPUT DATA / DATA LATCH OUTPUT DATA | 153a | 153b | 153c | 153d | 154a | 154b | 154c |
|---|---|---|---|---|---|---|---|
| U(0)+U(4) | $\frac{1}{2\sqrt{2}}$ | 0 | 0 | $\frac{1}{2\sqrt{2}}$ | 0 | — | — |
| U(0)−U(4) | 0 | $\frac{1}{2\sqrt{2}}$ | $\frac{1}{2\sqrt{2}}$ | 0 | 0 | — | — |
| U(3)+U(5) | $\frac{1}{2\sqrt{2}}\cos\frac{1}{16}\pi$ | $\frac{1}{2\sqrt{2}}\cos\frac{3}{16}\pi$ | $-\frac{1}{2\sqrt{2}}\cos\frac{5}{16}\pi$ | $-\frac{1}{2\sqrt{2}}\cos\frac{7}{16}\pi$ | — | — | — |
| U(3)−U(5) | $\frac{1}{2\sqrt{2}}\cos\frac{7}{16}\pi$ | $\frac{1}{2\sqrt{2}}\cos\frac{5}{16}\pi$ | $-\frac{1}{2\sqrt{2}}\cos\frac{3}{16}\pi$ | $-\frac{1}{2\sqrt{2}}\cos\frac{1}{16}\pi$ | — | — | — |
| U(2)+U(6) | $\frac{1}{2\sqrt{2}}\cos\frac{1}{8}\pi$ | $\frac{1}{2\sqrt{2}}\cos\frac{3}{8}\pi$ | $\frac{1}{2\sqrt{2}}\cos\frac{3}{8}\pi$ | $-\frac{1}{2\sqrt{2}}\cos\frac{1}{8}\pi$ | 0 | — | — |
| U(2)−U(6) | $\frac{1}{2\sqrt{2}}\cos\frac{3}{8}\pi$ | $\frac{1}{2\sqrt{2}}\cos\frac{1}{8}\pi$ | $\frac{1}{2\sqrt{2}}\cos\frac{1}{8}\pi$ | $-\frac{1}{2\sqrt{2}}\cos\frac{3}{8}\pi$ | 0 | — | — |
| U(1)+U(7) | $\frac{1}{2\sqrt{2}}\cos\frac{3}{16}\pi$ | $-\frac{1}{2\sqrt{2}}\cos\frac{7}{16}\pi$ | $-\frac{1}{2\sqrt{2}}\cos\frac{1}{16}\pi$ | $\frac{1}{2\sqrt{2}}\cos\frac{5}{16}\pi$ | — | — | — |
| U(1)−U(7) | $\frac{1}{2\sqrt{2}}\cos\frac{5}{16}\pi$ | $-\frac{1}{2\sqrt{2}}\cos\frac{1}{16}\pi$ | $-\frac{1}{2\sqrt{2}}\cos\frac{7}{16}\pi$ | $-\frac{1}{2\sqrt{2}}\cos\frac{3}{16}\pi$ | — | — | — |

F I G. 25

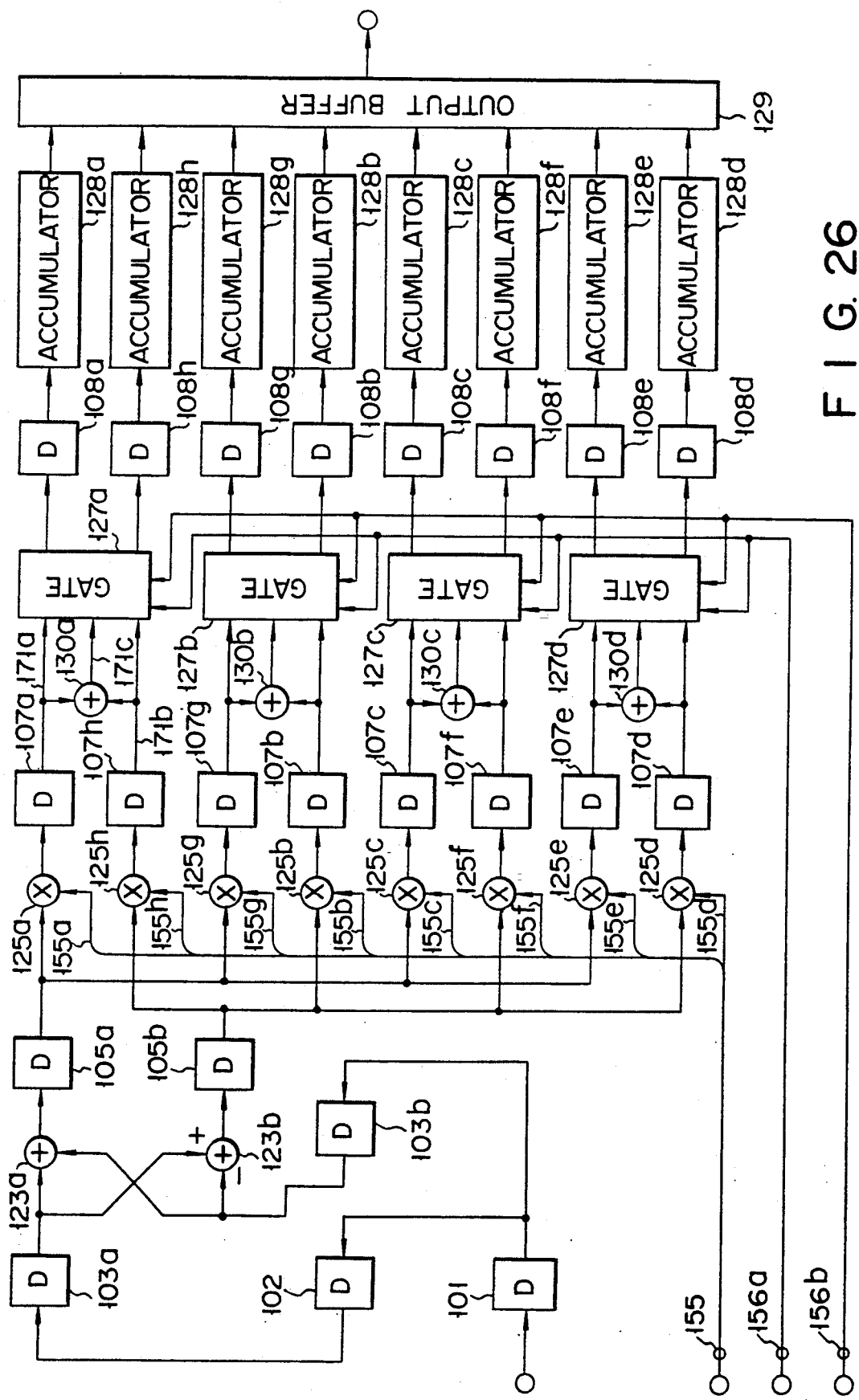
F I G. 26

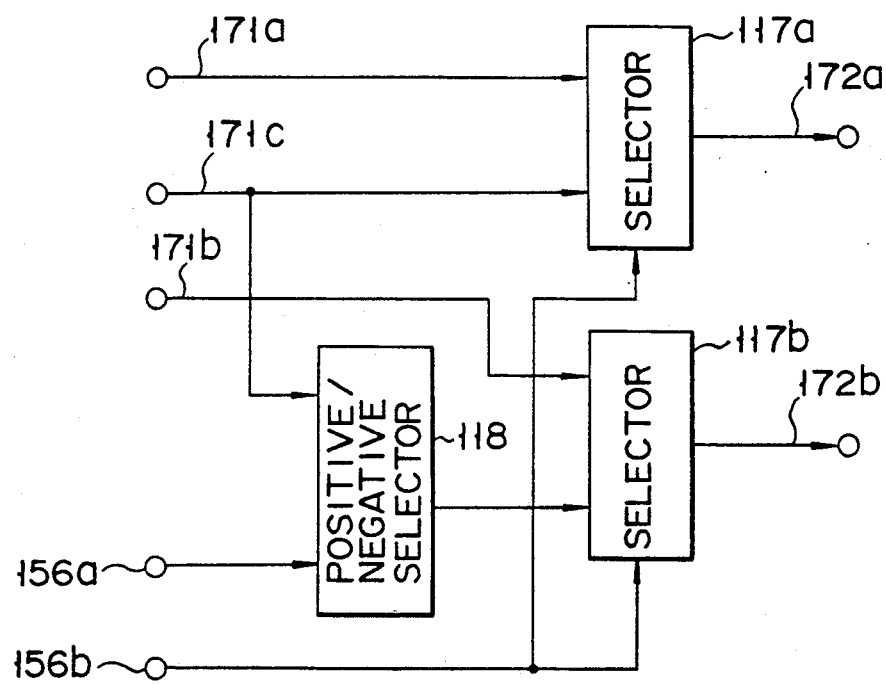
F I G. 27

FIG. 29A

| INPUT DATA / DATA LATCH (105a) OUTPUT | 155a | 155b | 155c | 155d | 156a |
|---|---|---|---|---|---|
| X(3)+X(4) | $\frac{1}{2\sqrt{2}}$ | $-\frac{1}{2}\cos\frac{3}{8}\pi$ | $-\frac{1}{2}\cos\frac{1}{8}\pi$ | $\frac{1}{2\sqrt{2}}$ | 0 |
| X(2)+X(5) | $\frac{1}{2\sqrt{2}}$ | $\frac{1}{2}\cos\frac{1}{8}\pi$ | $-\frac{1}{2}\cos\frac{3}{8}\pi$ | $-\frac{1}{2\sqrt{2}}$ | 0 |
| X(1)+X(6) | $-\frac{1}{2\sqrt{2}}$ | $\frac{1}{2}\cos\frac{3}{8}\pi$ | $\frac{1}{2}\cos\frac{3}{8}\pi$ | $-\frac{1}{2\sqrt{2}}$ | 0 |
| X(0)+X(7) | $-\frac{1}{2\sqrt{2}}$ | $\frac{1}{2}\cos\frac{3}{8}\pi$ | $-\frac{1}{2}\cos\frac{1}{8}\pi$ | $\frac{1}{2\sqrt{2}}$ | 0 |

FIG. 29B

| INPUT DATA / DATA LATCH (105b) OUTPUT | 155h | 155g | 155f | 155e | 156b |
|---|---|---|---|---|---|
| X(3)−X(4) | $-\frac{1}{2}\cos\frac{1}{16}\pi$ | $\frac{1}{2}\cos\frac{7}{16}\pi$ | $\frac{1}{2}\cos\frac{3}{16}\pi$ | $-\frac{1}{2}\cos\frac{5}{16}\pi$ | 0 |
| X(2)−X(5) | $-\frac{1}{2}\cos\frac{3}{16}\pi$ | $\frac{1}{2}\cos\frac{5}{16}\pi$ | $-\frac{1}{2}\cos\frac{7}{16}\pi$ | $-\frac{1}{2}\cos\frac{1}{16}\pi$ | 0 |
| X(1)−X(6) | $-\frac{1}{2}\cos\frac{5}{16}\pi$ | $\frac{1}{2}\cos\frac{3}{16}\pi$ | $\frac{1}{2}\cos\frac{1}{16}\pi$ | $-\frac{1}{2}\cos\frac{7}{16}\pi$ | 0 |
| X(0)−X(7) | $-\frac{1}{2}\cos\frac{7}{16}\pi$ | $\frac{1}{2}\cos\frac{1}{16}\pi$ | $\frac{1}{2}\cos\frac{5}{16}\pi$ | $-\frac{1}{2}\cos\frac{3}{16}\pi$ | 0 |

FIG. 31A

| INPUT DATA / DATA LATCH (105a) OUTPUT | 155a | 155b | 155c | 155d | 156a |
|---|---|---|---|---|---|
| U(0)+U(4) | $\frac{1}{2\sqrt{2}}$ | 0 | 0 | $\frac{1}{2\sqrt{2}}$ | 0 |
| U(3)+U(5) | $\frac{1}{2\sqrt{2}}\cos\frac{1}{16}\pi$ | $\frac{1}{2\sqrt{2}}\cos\frac{3}{16}\pi$ | $-\frac{1}{2\sqrt{2}}\cos\frac{5}{16}\pi$ | $-\frac{1}{2\sqrt{2}}\cos\frac{7}{16}\pi$ | 1 |
| U(2)+U(6) | $\frac{1}{2\sqrt{2}}\cos\frac{1}{8}\pi$ | $-\frac{1}{2\sqrt{2}}\cos\frac{3}{8}\pi$ | $-\frac{1}{2\sqrt{2}}\cos\frac{3}{8}\pi$ | $-\frac{1}{2\sqrt{2}}\cos\frac{1}{8}\pi$ | 0 |
| U(1)+U(7) | $\frac{1}{2\sqrt{2}}\cos\frac{3}{16}\pi$ | $-\frac{1}{2\sqrt{2}}\cos\frac{7}{16}\pi$ | $\frac{1}{2\sqrt{2}}\cos\frac{1}{16}\pi$ | $\frac{1}{2\sqrt{2}}\cos\frac{5}{16}\pi$ | 1 |

FIG. 31B

| INPUT DATA / DATA LATCH (105b) OUTPUT | 155h | 155g | 155f | 155e | 156b |
|---|---|---|---|---|---|
| U(0)−U(4) | 0 | $\frac{1}{2\sqrt{2}}$ | $\frac{1}{2\sqrt{2}}$ | 0 | 1 |
| U(3)−U(5) | $\frac{1}{2\sqrt{2}}\cos\frac{7}{16}\pi$ | $-\frac{1}{2\sqrt{2}}\cos\frac{5}{16}\pi$ | $\frac{1}{2\sqrt{2}}\cos\frac{3}{16}\pi$ | $-\frac{1}{2\sqrt{2}}\cos\frac{1}{16}\pi$ | 1 |
| U(2)−U(6) | $\frac{1}{2\sqrt{2}}\cos\frac{3}{8}\pi$ | $-\frac{1}{2\sqrt{2}}\cos\frac{1}{8}\pi$ | $-\frac{1}{2\sqrt{2}}\cos\frac{1}{8}\pi$ | $-\frac{1}{2\sqrt{2}}\cos\frac{3}{8}\pi$ | 1 |
| U(1)−U(7) | $\frac{1}{2\sqrt{2}}\cos\frac{5}{16}\pi$ | $-\frac{1}{2\sqrt{2}}\cos\frac{1}{16}\pi$ | $-\frac{1}{2\sqrt{2}}\cos\frac{7}{16}\pi$ | $-\frac{1}{2\sqrt{2}}\cos\frac{3}{16}\pi$ | 1 |

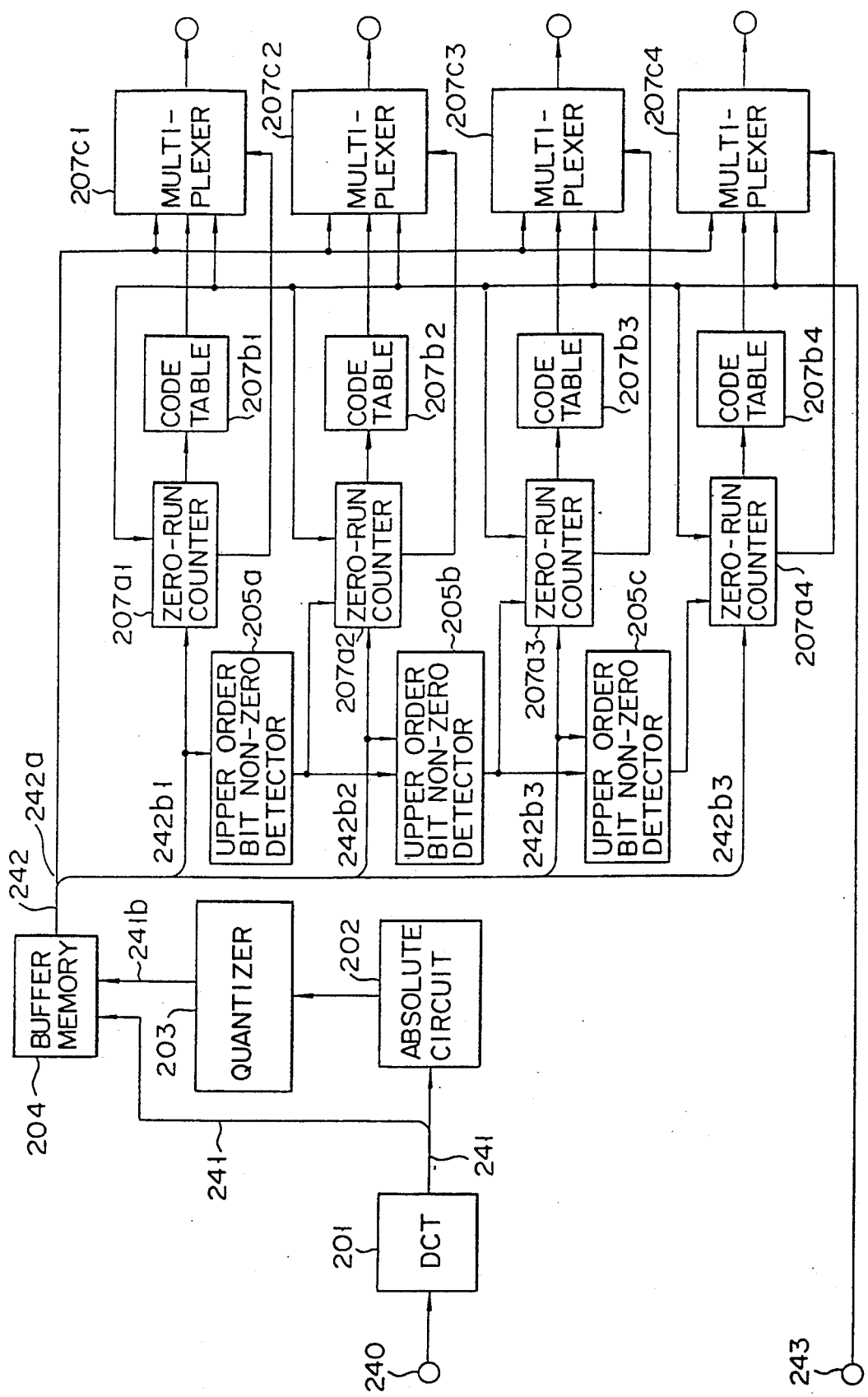
F I G. 33

| BIT PLANE | BLOCK | CODE DATA |
|---|---|---|
| 1st | K | $Z_0 S_1 E(Z_7)$ |
| | K+1 | $E(Z_8)$ |
| | K+2 | $Z_2 S_0 Z_0 S_1 E(Z_5)$ |
| | K+3 | $Z_1 S_0 Z_2 S_1 E(Z_5)$ |
| 2nd | K | $Z_1 Z_0 S_1 Z_0 S_0 Z_2 S_0 Z_1 S_1$ |
| | K+1 | $Z_2 S_0 Z_1 S_1 Z_0 S_0 E(Z_2)$ |
| | K+2 | $Z_2 Z_0 S_0 E(Z_5)$ |
| | K+3 | $Z_2 Z_1 S_0 Z_0 S_1 Z_0 S_1 E(Z_2)$ |
| 3rd | K | $Z_2 Z_4 S_0$ |
| | K+1 | $Z_0 Z_1 Z_1 S_0 Z_0 S_1 Z_0 S_1 Z_0 S_1$ |
| | K+2 | $Z_3 Z_0 S_0 Z_2 S_1 Z_0 S_1$ |
| | K+3 | $Z_5 Z_1 S_1 Z_0 S_0$ |
| 4th | K | $Z_6 Z_0 S_0 Z_0 S_0$ |
| | K+1 | $Z_0 Z_3 Z_2 Z_0 S_0$ |
| | K+2 | $Z_1 Z_1 Z_2 Z_1 S_1$ |
| | K+3 | $Z_0 Z_3 E(Z_1)$ |

F I G. 35

| BIT PLANE | BLOCK | CODE DATA |
|---|---|---|
| 1st | K | $Z_0 S_1 E$ |
| | K+1 | $E$ |
| | K+2 | $Z_2 S_0 Z_0 S_1 E$ |
| | K+3 | $Z_1 S_0 Z_2 S_1 E$ |
| 2nd | K | $Z_1 S_1 Z_0 S_0 Z_2 S_0 Z_1 S_1$ |
| | K+1 | $Z_2 S_0 Z_1 S_1 Z_0 S_0 E$ |
| | K+2 | $Z_0 S_0 E (Z_7)$ |
| | K+3 | $Z_2 S_0 Z_0 S_1 Z_1 S_1 E (Z_2)$ |
| 3rd | K | $Z_2 Z_3 S_0 E (Z_1)$ |
| | K+1 | $Z_1 S_0 Z_0 Z_0 S_1 Z_1 Z_0 S_1 Z_0 S_1$ |
| | K+2 | $Z_1 S_0 Z_4 S_1 Z_0 S_1$ |
| | K+3 | $Z_6 S_1 Z_0 S_0$ |
| 4th | K | $Z_3 S_0 Z_0 S_0 E (Z_3)$ |
| | K+1 | $Z_0 S_0 Z_0 Z_3 S_0 E (Z_2)$ |
| | K+2 | $Z_1 Z_1 Z_1 S_1 E (Z_2)$ |
| | K+3 | $Z_1 Z_3 E (Z_2)$ |

F I G. 36

| BIT PLANE | BLOCK | CODE DATA |
|---|---|---|
| 1st | K | $Z_0O_2E(Z_7)$ |
| | K+1 | $E(Z_8)$ |
| | K+2 | $Z_2O_1Z_1O_2E(Z_4)$ |
| | K+3 | $Z_1O_1Z_3O_2E(Z_3)$ |
| 2nd | K | $Z_1O_3Z_3O_1Z_2O_2$ |
| | K+1 | $Z_2O_1Z_2O_3E(Z_3)$ |
| | K+2 | $Z_0O_1(Z_8)$ |
| | K+3 | $Z_2O_1Z_1O_2Z_1O_2E(Z_2)$ |
| 3rd | K | $Z_2O_1Z_3O_1E(Z_2)$ |
| | K+1 | $Z_1O_1Z_1O_3Z_1O_5$ |
| | K+2 | $Z_1O_1Z_5O_4$ |
| | K+3 | $Z_6O_3E(Z_1)$ |
| 4th | K | $Z_3O_1Z_1O_1E(Z_4)$ |
| | K+1 | $Z_0O_1Z_0O_1Z_3O_1E(Z_3)$ |
| | K+2 | $Z_1O_1Z_1O_1Z_1O_2E(Z_2)$ |
| | K+3 | $Z_1O_1Z_3O_1E(Z_2)$ |

F I G. 37

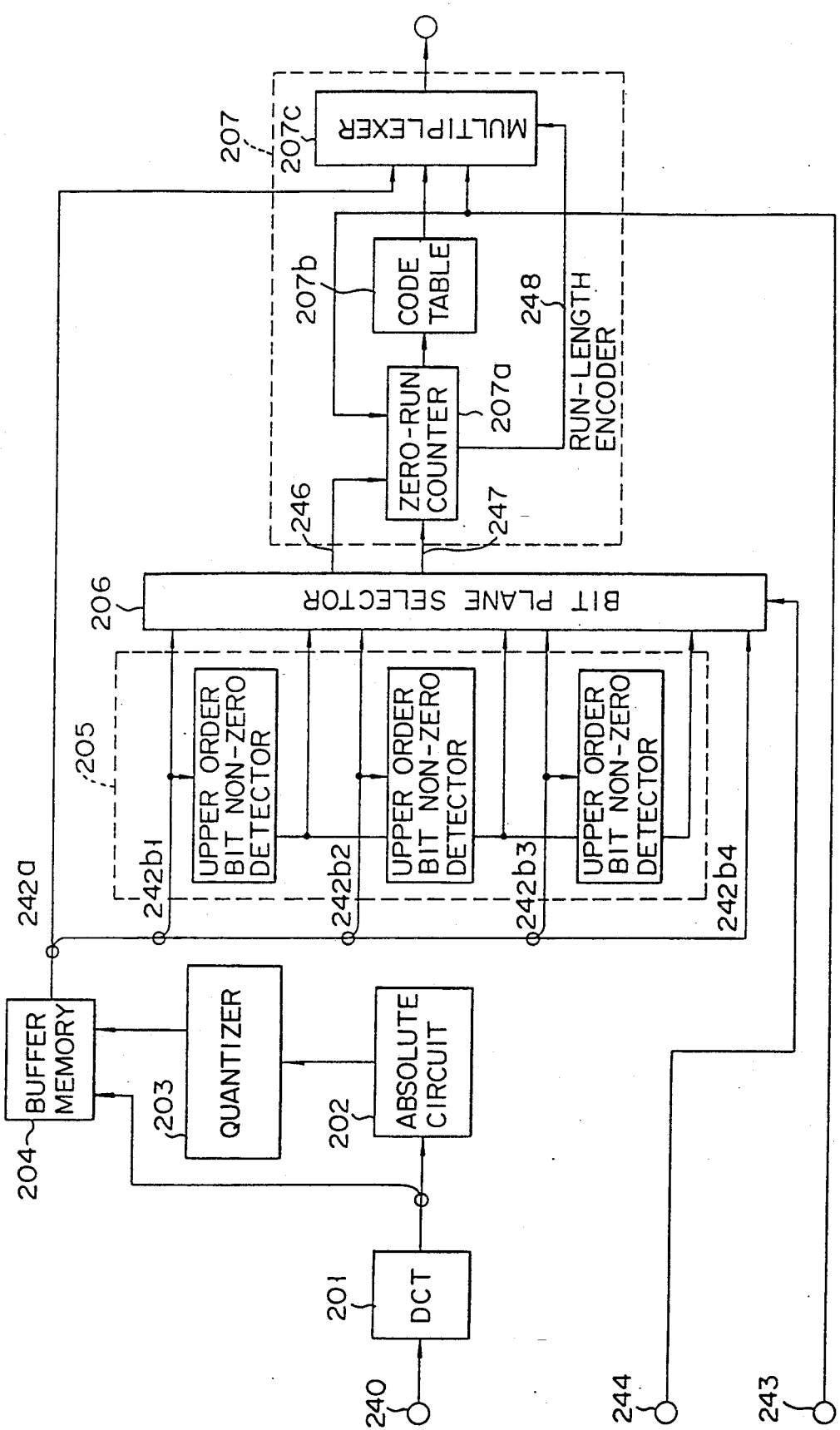
F I G. 38

| BIT PLANE | BLOCK | CODE DATA |
|---|---|---|
| 1st | K | $B_X Z_0 S_1 E(Z_7)$ |
| | K+1 | |
| | K+2 | $B_1 Z_2 S_0 S_1 E(Z_5)$ |
| | K+3 | $B_0 Z_1 S_0 Z_2 S_1 E(Z_2)$ |
| 2nd | K | $Z_1 Z_0 S_1 Z_0 S_0 Z_2 S_0 Z_1 S_1$ |
| | K+1 | $B_0 Z_2 S_0 Z_1 S_1 Z_0 S_0 E(Z_2)$ |
| | K+2 | $Z_2 Z_0 S_0 E(Z_5)$ |
| | K+3 | $Z_2 Z_1 S_0 Z_0 S_1 Z_0 S_1 E(Z_2)$ |
| 3rd | K | $Z_2 Z_4 S_0$ |
| | K+1 | $Z_0 Z_1 Z_1 S_0 Z_0 S_1 Z_0 S_1 Z_0 S_1$ |
| | K+2 | $Z_3 Z_0 S_0 Z_2 S_1 Z_0 S_1$ |
| | K+3 | $Z_5 Z_1 S_1 Z_0 S_0$ |
| 4th | K | $Z_6 Z_0 S_0 Z_0 S_0$ |
| | K+1 | $Z_0 Z_3 Z_2 Z_0 S_0$ |
| | K+2 | $Z_1 Z_1 Z_2 Z_1 S_1$ |
| | K+3 | $Z_0 Z_3 E(Z_1)$ |

F I G. 41

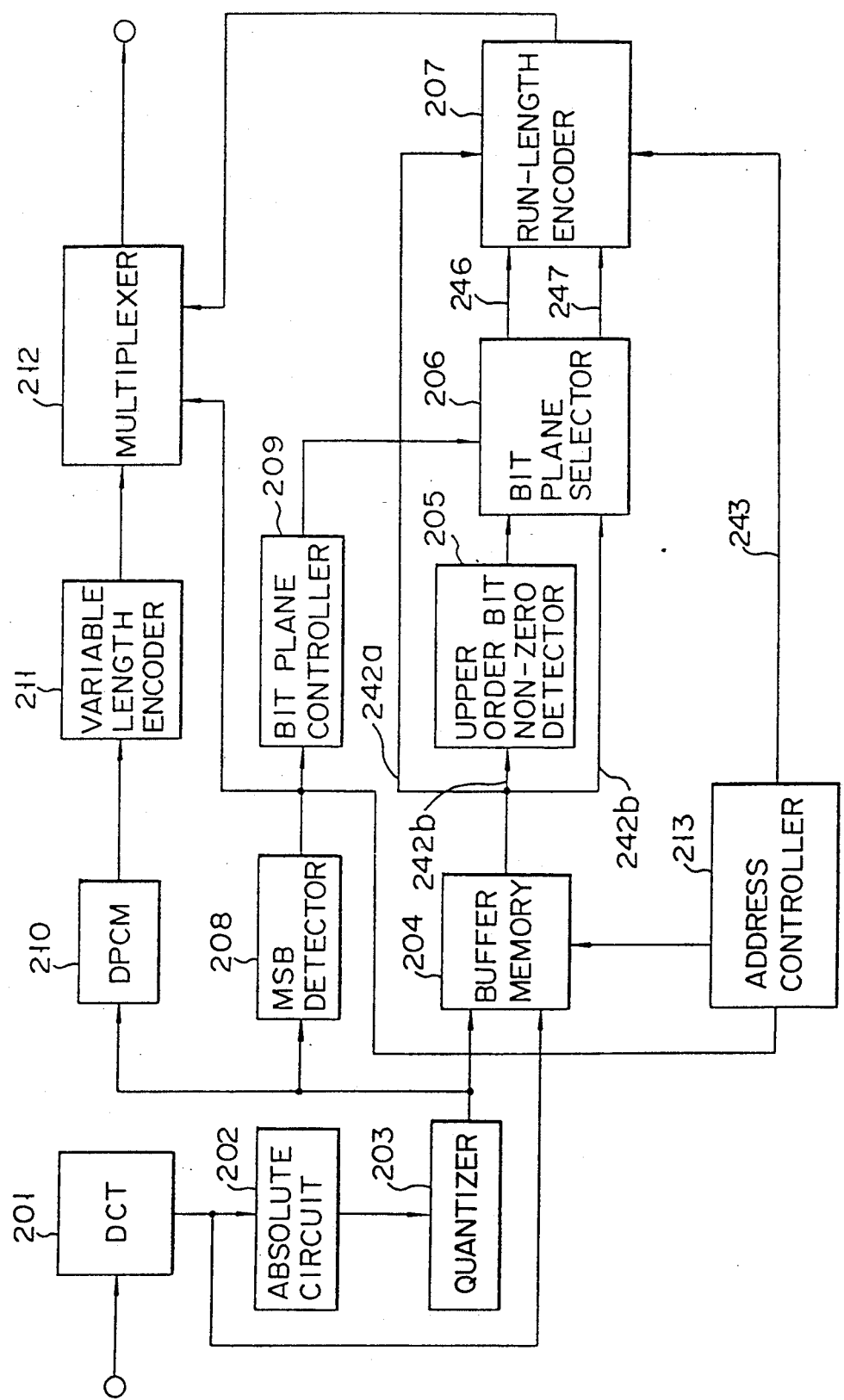
F I G. 42

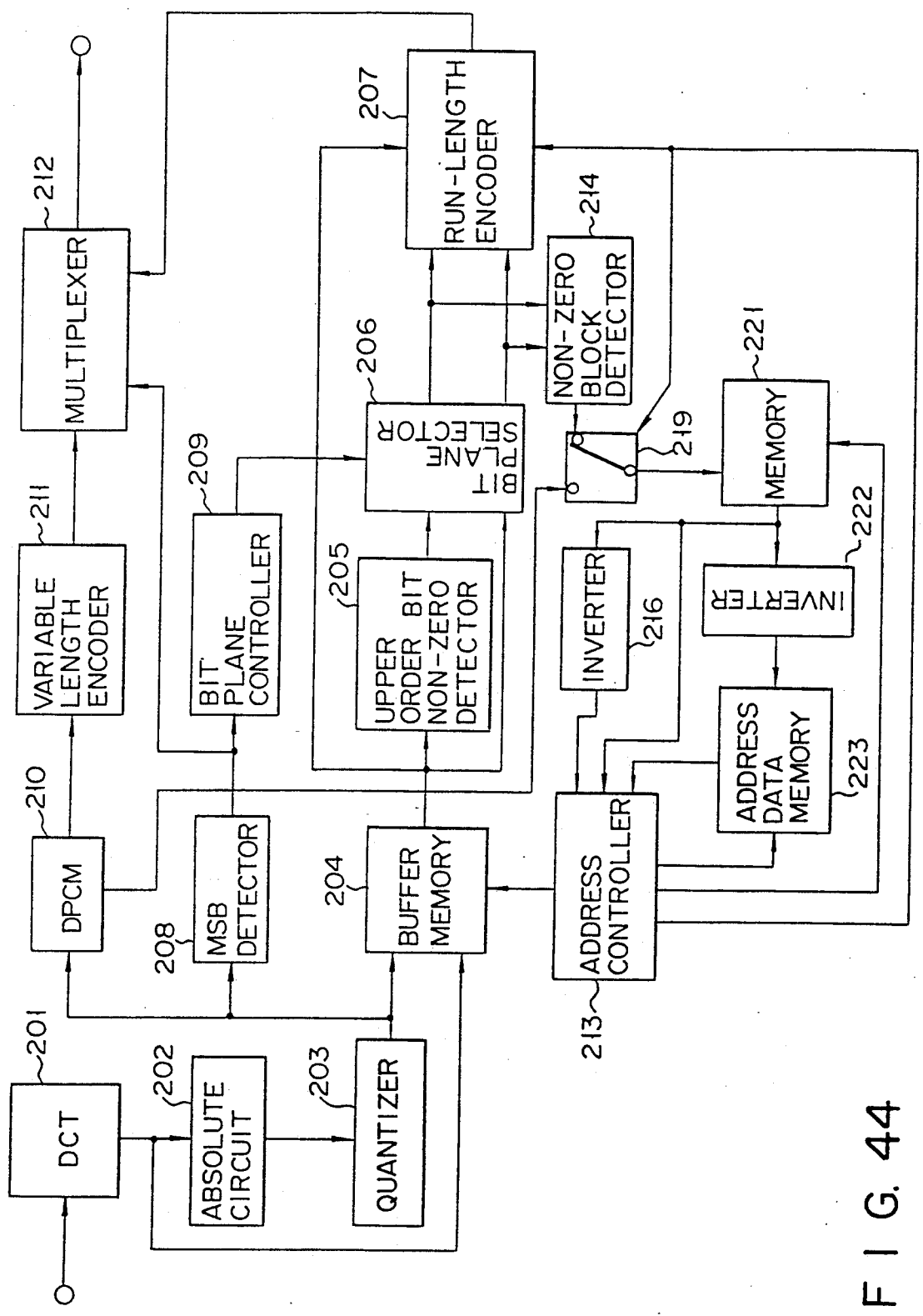
F I G. 44

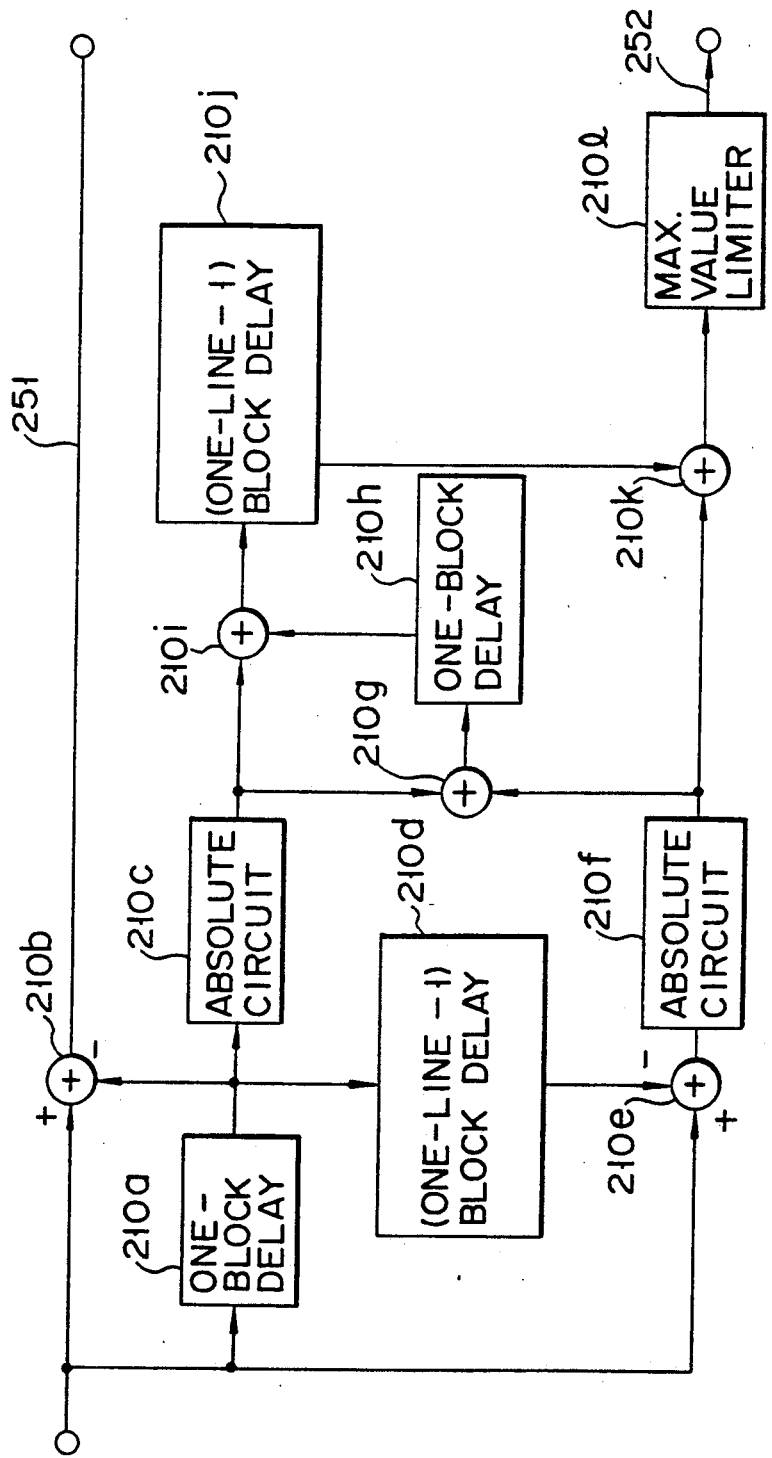
F I G. 45

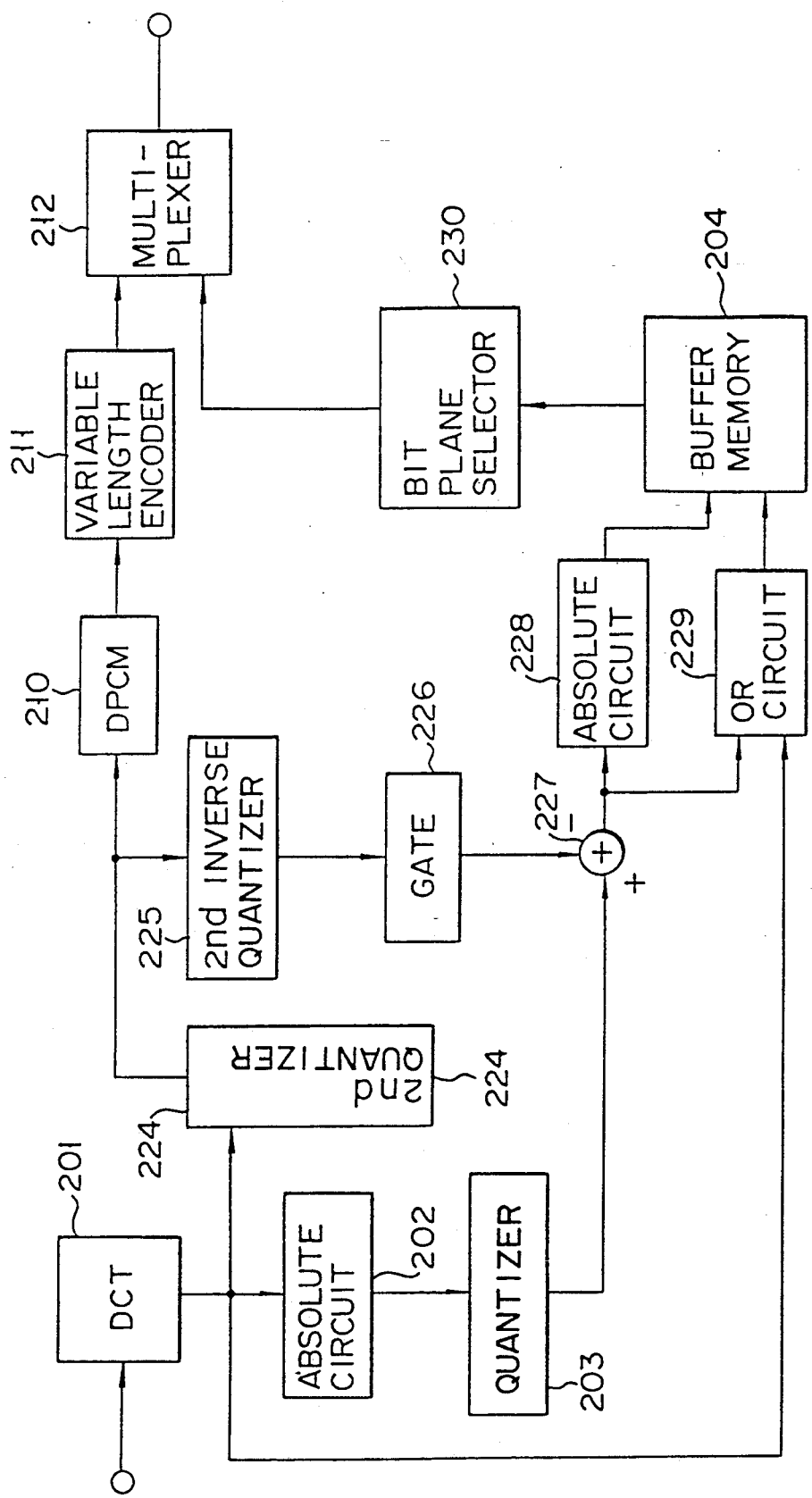
F I G. 46

DISCRETE COSINE TRANSFORMING APPARATUS

This is a division of application Ser. No. 07/458,997, filed on Dec. 27, 1989, now abandoned.

BACKGROUND OF THE INVENTION

1. Field of the Invention

The present invention relates to a discrete cosine transforming apparatus with a pipeline processing ability.

2. Description of the Related Art

U.S. Pat. No. 4,385,363, issued May 1983, may be enumerated as a typical example of the discrete cosine transforming apparatus of this type. In this discrete cosine transforming apparatus, two types of basic arithmetic circuits are arrayed in five stages Basic arithmetic circuits A, i.e., shuffle/add circuits, are arrayed at the first, second and fourth stages, and basic arithmetic circuits C, i.e., shuffle/add/multiply, are arrayed at the the third and fourth stages. The shuffle/add circuit A includes a circuit for temporarily storing input data and a circuit for addition or subtraction. The shuffle/add/multiply circuit C includes a circuit for temporarily storing input data, two multipliers, and a circuit for adding or subtracting the results of the multiplication. The prior art apparatus uses four multipliers for a 16th-order cosine transform. To effect an inverse transform, an arithmetic circuit is changed to another arithmetic circuit or the basic arithmetic circuit A of the first stage is designed so as to have two multipliers, like the basic arithmetic circuit C.

Thus, to effect the 16th-order cosine transform and its inverse transform, at least four multipliers and selectors at the input and the output of the basic arithmetic circuit are required To improve an accuracy of the arithmetic operation, a considerably large hardware is required.

Thus, the prior apparatus has a disadvantage that the higher the accuracy of the arithmetic operation is, the larger the hardware scale is.

SUMMARY OF THE INVENTION

Accordingly, an object of the present invention is to provide a discrete cosine transforming apparatus in which the multipliers are effectively used, a smaller number of multipliers is required, the same hardware is used for both the discrete cosine transform and its inverse transform, and no select circuit is provided at the input and the output of the basic arithmetic circuit.

According to one aspect of the present invention, there is provided a discrete cosine transforming apparatus for exercising a $2^{(n+1)}$th order discrete cosine transform comprising basic arithmetic circuits A including circuits for temporarily storing input data and adding the input data or subtracting the input data one from the other, and another basic arithmetic circuits B including circuits for temporarily storing input data and adding the input data or subtracting the multiplication result data that is equal to or less than the input data. The basic arithmetic circuit is located at a first stage, and then the basic arithmetic circuits B and the arithmetic circuit A are alternately arranged, thereby to form a cascade connection of "n" stages. For the inverse transform, the same circuit arrangement as that for the cosine transform is used and the direction of a signal flow is inversed.

The basic arithmetic circuits A of at least the first stage and the last stage are able to output the input data as intact.

In the apparatus, as already mentioned, the same hardware arrangement is used for both the discrete cosine transform and its inverse transform. Accordingly, the cosine transform and its inverse transform can be switched from one to the other and vice versa in a very simple manner. In the multiplier stages, the number of multiplying operations is equal to or less than the number of input data Therefore, a pipeline processing can be made with a single multiplier. In other words, the discrete cosine transform of the $2^{n+1}$th order and its inverse transform can be realized with multipliers of "n". Therefore, the related hardware is very simple.

Additionally, the transform order may be increased if a matrix operation circuit is used wherein the intermediate buffer memory is used as a multiplier RAM, and a butterfly adder is used as an accumulator/adder.

According to another aspect of the invention, there is provided a discrete cosine transforming/reverse transforming apparatus which exercises a 2n-th order discrete cosine transform of the data of 2n (n=natural number) and its inverse transform, comprising an arithmetic circuit data for working out the sum of and the difference between each pair of input data, and for generating data of "n"; multipliers equal to or less than "n" for sequentially multiplying the difference data and the sum data by coefficients; a gate circuit for outputting the multiplication result data as it is, or after it is inverted or after it is zeroed in accordance with an external command; and an accumulator/adder of 2n for accumulating and adding the output data of said gate circuit 2n times, and outputting the result of accumulation and addition.

According to another aspect of the invention, there is provided a discrete cosine transforming/reverse transforming apparatus which exercises a 2n-th order discrete cosine transform of the data of 2n (n=natural number) and its inverse transform, comprising: an arithmetic circuit data for working out the sum of and the difference between each pair of input data, and for generating data of "n"; multipliers equal to or less than "n" for simultaneously multiplying the difference data and the sum data by coefficients; a gate circuit for outputting the multiplication result data as it is, or the multiplication result data for the difference data and the multiplication result data for the sum data as they are or after they are inverted in accordance with external command data; and accumulator/adder circuits of 2n for accumulating and adding the output data of said gate circuit "n" times, and for outputting the result of accumulation/addition.

With such an arrangement, the sum of two data and the difference between them are worked out every time two data are inputted to the apparatus. Two accumulator/adder circuits, each of which adds and subtracts the results of the multiplication of the data by coefficients, are provided for one multiplier. Therefore, the number of multipliers required for processing input data is half of the number of the accumulator/adder circuits that is equal to the figure representative of the transform order.

Further, the sum of two data and the difference between them are simultaneously worked out every time two data are inputted to the apparatus. The number of the accumulator/adder circuits, each of which adds or subtracts the results of the multiplication of the data by coefficients, or two sums of the multiplication results, is equal to that of multipliers. In those circuits, however, addition, subtraction and multiplication are performed every time two data are inputted. Therefore, the apparatus is capable of inputting and processing data at a high speed, two times that of the prior matrix operation.

According to still another aspect of the present invention, there is provided a bit plane coding system in which image data distributed in positive and negative domains are separated into positive and negative data, and amplitude data expressed in terms of a binary system. The amplitude data is sorted, for each code bit plane, into bit data of the data which contains at least one non-zero bit in the upper order than an code bit plane and bit data of the data which contains only "0's" in the upper order than an code bit plane for each code bit plane, successively from the most significant bit of the amplitude data. As for the bit data of the data whose bit data ordered higher than the code bit plane are all "0's", data representative of the number of "0's" present up to a non-zero bit and the positive/negative data of said data are coded. As for the bit data of the data whose bit data ordered higher than the code bit plane contains non-zero bits, if single, the number of consecutive binary data or the bit data per se is coded, whereby the data is coded in the ascending order of the absolute value of the data.

In bit-plane coding an AC component of the coefficient as is cosine transformed in a block size, the data representative of the number of the coefficients of non-zero are stored for each block, and those blocks are sorted into blocks containing at least one coefficient of non-zero and blocks not containing the non-zero coefficient.

According to a further aspect of the present invention, there is provided a bit-plane coding system in which data coding starts from the block in which one or more coefficients have already been non-zero in the next code bit plane, and then for the block not containing the coefficient that is non-zero in a coded bit plane, the number of consecutive blocks in which the coefficient to be non-zero, except the coded block, are not contained in a predetermined order, and uncoded blocks containing the coefficients to be non-zero are coded.

The DC components of the coefficient as is cosine transformed in a block size are quantitized and coded for all of the blocks, the sum of the absolute values of the differences between the quantitized DC components of the adjacent blocks is worked out for each block, the AC components of the coefficient are coded in the ascending order of the block having a large sum of absolute values.

In the amplitude data of a large absolute value, the non-zero bit data is highly possibly present in the upper order bit plane. For this reason, the data is coded in the ascending order of the data having a large sum of absolute values by the bit plane coding. The data whose the positive/negative sign is coded is only the data to be non-zero for the first time in the bit plane. Accordingly, the positive/negative sign of the data of small amplitude tends to be coded in the lower order bit plane.

The amplitude data is separated into bit data of the data which contains at least one non-zero bit in the upper order than an code bit plane and bit data of the data which contains only "0's" in the upper order than an code bit plane for each code bit plane. With this feature, the data may be sorted into a portion of the data where a redundancy reduction efficiency cannot be improved by the run-length coding, and another portion of the data where a redundancy reduction efficiency can be improved by the run-length coding. Therefore, an optimum coding is realized.

In bit-plane coding the AC component of the coefficient as is cosine transformed in a block size, presence or absence of the coefficient that is non-zero in the coded bit plane is stored. Accordingly, the data representative of an order of blocks to be coded is not coded in the next plane. The block containing the coefficient of non-zero may be coded without coding the address data of the block. The positive/negative sign is coded only for the data to be non-zero for the first time in the bit plane. The data representative of the number of consecutive blocks in which the data ordered higher than the code bit plane are all "0's", except the coded block in the code bit plane, is coded. As for the AC component of the coefficient as is cosine transformed in a block size, the block having a large sum of the absolute values of the differences between the quantitized DC components of adjacent blocks has a large probability that it contains the coefficient having a large absolute value. Therefore, the DC component of the coefficient as is cosine transformed are quantitized and coded for all of the blocks The sum of the absolute values of the differences between the quantitized DC components of adjacent blocks is worked out for each block. The AC components are bit plane coded in the descending order of the sum of the absolute values. The blocks containing non-zero bits to be coded are arrayed consecutively. As a consequence, the address data of the blocks to be coded may be coded in terms of codes consisting of a smaller number of bits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A, 7B, 8A and 8B show circuit diagrams of circuit arrangements which the number of multiplications is further reduced in the high speed operation algorithm;

FIGS. 12A, 12B, 13A and 13B show timing charges for explaining the operations of the FIGS. 10 and 11 circuits;

FIG. 18 is a circuit diagram showing an accumulator/add circuit used in the FIG. 14 embodiment;

FIG. 19 is a circuit diagram showing an output buffer circuit used in the FIG. 14 embodiment;

FIG. 20 is a circuit diagram showing another output buffer circuit used in the FIG. 14 embodiment;

FIG. 22 shows examples of data inputted to multiplier and gate circuits of the FIG. 14 embodiment;

FIG. 25 shows examples of data inputted to multiplier and gate circuits of the FIG. 14 embodiment when it is operated in an inverse transform mode;

FIG. 26 is a block diagram showing a discrete cosine transforming/inverse transforming apparatus according to another embodiment of the present invention;

FIG. 27 is a circuit diagram showing a gate circuit used in the FIG. 26 embodiment;

FIGS. 29A and 29B show examples of data inputted to multiplier and gate circuits of the FIG. 26 embodiment;

FIGS. 31A and 31B show examples of data inputted to multiplier and gate circuits of the FIG. 26 embodiment when it is operated in an inverse transform mode;

FIG. 33 is a block diagram showing a coding device using the discrete cosine transforming apparatus;

FIGS. 34A and 34B show a diagram showing quantitized data and coding order used in the FIG. 33 apparatus;

FIGS. 35 through 37 are explanatory diagrams for explaining examples of coding by the FIG. 33 device;

FIG. 38 is a block diagram of another coding device;

FIG. 41 is an explanatory diagram showing examples of coding by the FIG. 40 device;

FIGS. 42 to 44 are block diagrams showing other coding devices;

FIG. 45 is a circuit diagram showing a differential PCM arithmetic unit used in the FIG. 44 device; and FIG. 46 is a block diagram of still another coding device.

DETAILED DESCRIPTION OF THE PREFERRED EMBODIMENTS

Before proceeding with description of the embodiments of the present invention, it should be understood that an Nth order discrete cosine transform and an Nth order discrete inverse cosine transform are mathematically defined as below $$F(i) = \sqrt{\frac{2}{N}} \, ki \sum_{j=0}^{N-1} f(j) \frac{i(2j+1)}{2N} \pi$$

$$F(j) = \sqrt{\frac{2}{N}} \sum_{i=0}^{N-1} KiF(i) \frac{i(2j+1)}{2N} \pi$$

where
i, j = 0, 1, ..., N−1,
F(i) : original data (or inversely transformed data)
f(i) : transformed data
Ki = 1 (when i=0)
$1/\sqrt{2}$ (when i≠0)

Figure 1:
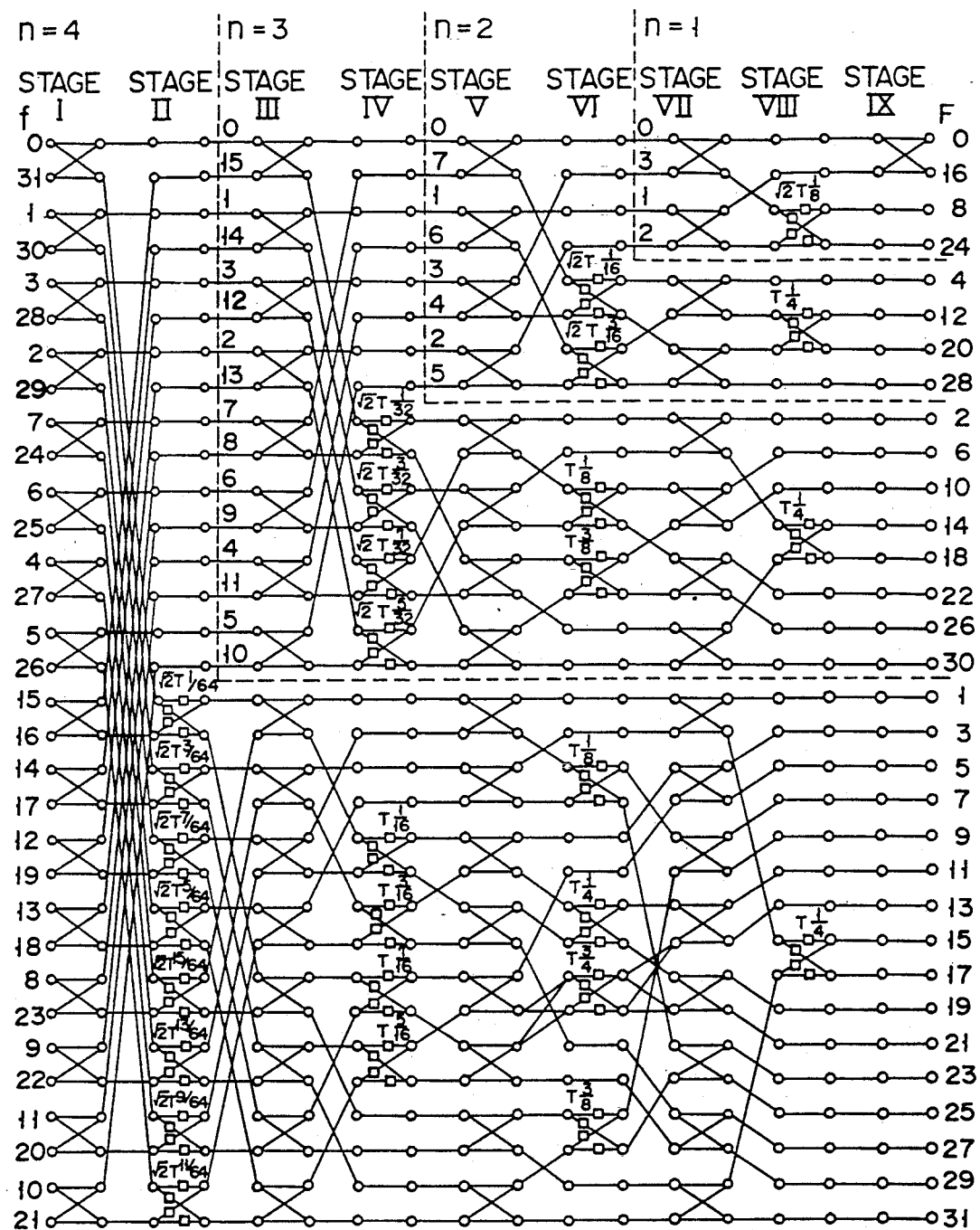
FIG. 1 is a diagram showing signal flows useful in explaining a novel algorithm for high speed arithmetic operation, which is used for the present invention.
Figure 2:
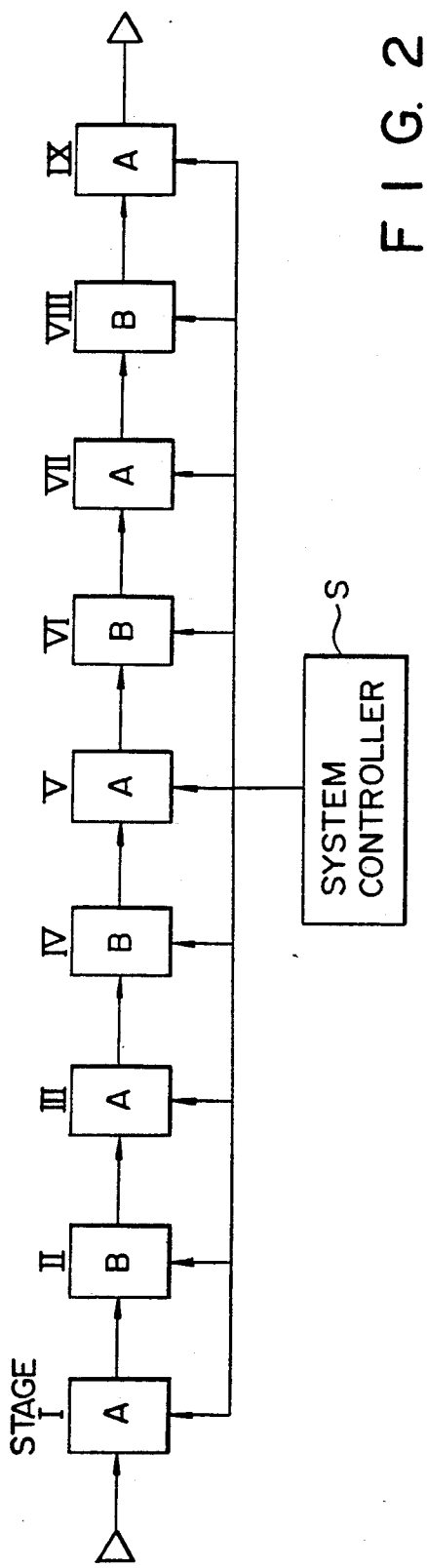
FIG. 2 is a block diagram showing a discrete cosine transforming apparatus according to an embodiment of the present invention.
Figure 3:
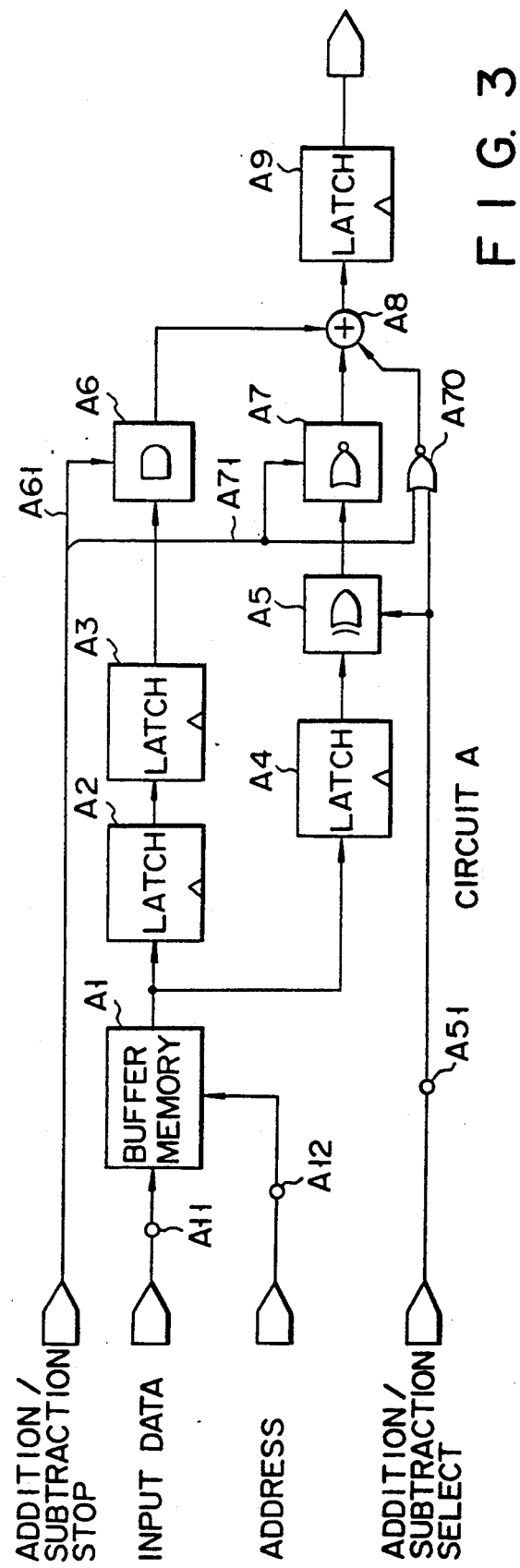
FIGS. 3 and 4 show circuit diagrams showing even- and odd-stages of arithmetic circuits shown in FIG. 2

FIG. 1 is a diagram showing signal flows in a 32nd-order discrete cosine transform, which is performed in a discrete cosine transforming apparatus according to an embodiment of the present invention. A hardware arrangement to exercise the signal flows of the discrete cosine transform of FIG. 1 is shown in FIG. 2. The STAGEs of FIG. 1, respectively, correspond to those in FIG. 2. The odd numbered stages each include a basic arithmetic circuit A which is arranged as shown in FIG. 3. In the figure, a memory A1 is a pipeline memory for temporarily storing input data A11. An order of reading out data from the memory A1 may be changed from that of inputting data thereto in accordance with an order in which an arithmetic operation progresses.

Data latches A2, A3 and A4 rearrange each data as is read out word by word, into an array of data whose data unit has two words. A sign inverter A5 inverts a sign of output data of the data latch A4 when the data of an add/subtraction select signal A51 is high ("1") in logic level, and inputs the inverted data to an add/subtraction-stop circuit A7. When an add/subtraction select signal A51 is low ("0") in logic level, the sign inverter A5 does not invert a sign of output data of the data latch A4, and inputs the data to the add/subtraction-stop circuit A7. An add/subtraction-stop circuit A6 transfers the output data of the data latch A3 as intact to an adder A8 when an add/subtraction-stop select signal A61 is high. When the add/subtraction-stop select signal A61 is low ("0") in logic level, the add/subtraction-stop circuit A6 sets all of the output data of the data latch A3 at "0"s, and inputs them to the adder A8. When an add/subtraction-stop select signal A71 is low, an add/subtraction-stop circuit A7 inverts the output data of the sign inverter A5, and inputs the inverted data to an adder A8. When the add/subtraction-stop select signal A71 is high, the add/subtraction-stop circuit A7 sets all of the output data at "0", and inputs the data of "all 0's" to the adder A8. When the add/subtraction-stop select signal A71 is low, an add-/subtraction-stop circuit A70 applies the data of an add/subtraction select signal as intact to a carrier input terminal of an adder A8. When the add/subtraction-stop select signal A71 is high, the add/subtraction-stop circuit A70 sets the data of the add/subtraction select signal at "0", and applies the data of "0" to the adder A8.

With such an arrangement, when the add/subtraction-stop select signals A61 and A71 are low ("0") in logic level, if the add/subtraction select signal A51 is high ("1") in logic level, the output data of the data latch A3 and the output data of the data latch A4 are added together. If the data of the add/subtraction select signal A51 is low, the output data of the data latch A4 is subtracted from the output data of the data latch A3. When the add/subtraction-stop select signals A61 and A71 are high, the adder A8 produces the output data of the data latch A3 as it is. When the add/subtraction-stop select signals A61 and A71 are low, if the add/subtraction selection signal A51 is high, the adder A produces the output data of the data latch A4 as it is. Thus, the basic arithmetic circuit A is capable of performing the operations in all of the odd-numbered STAGEs shown in FIG. 1.

Figure 4:
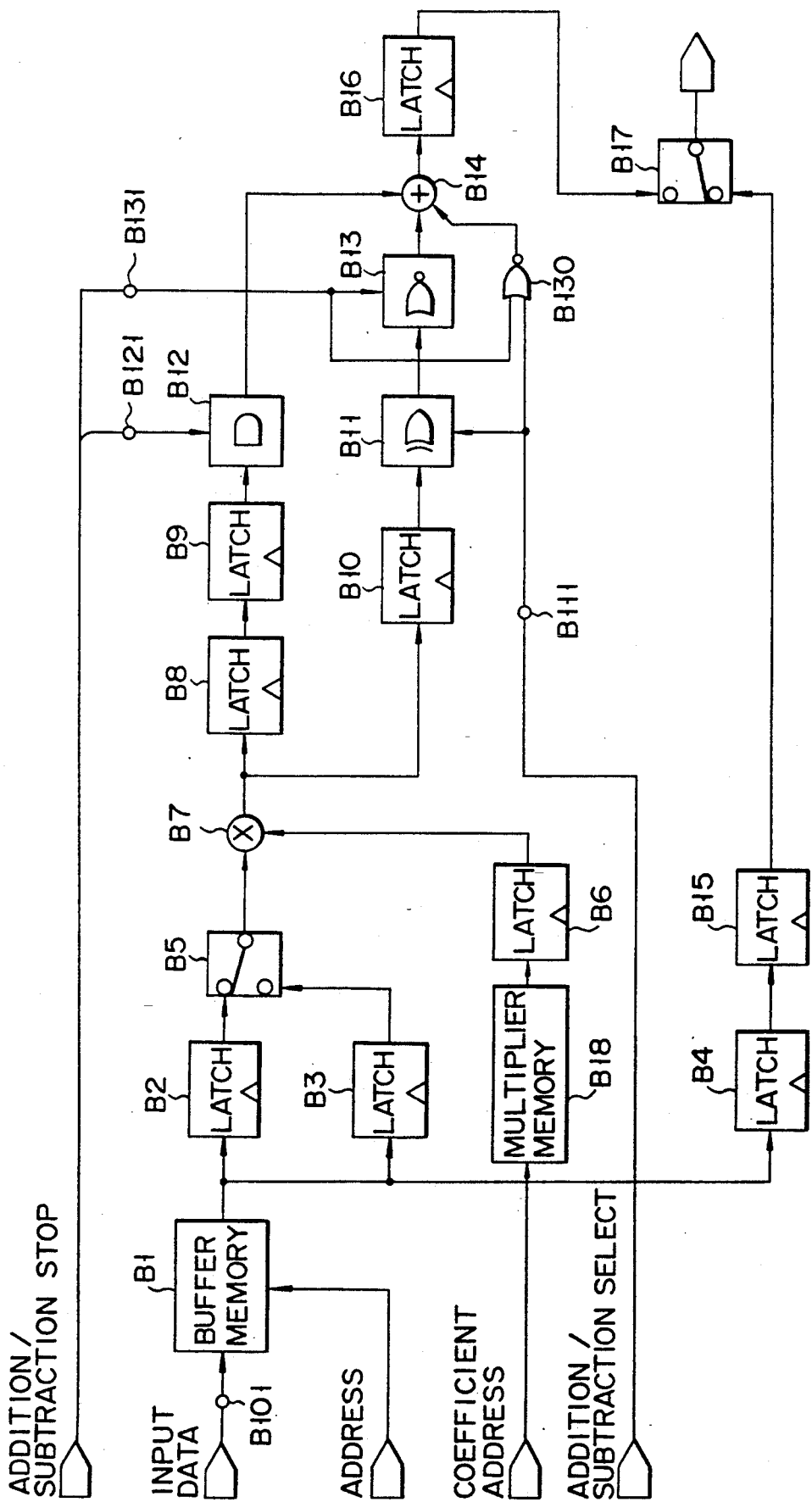

The basic arithmetic circuit B, which is used for the operations in the even-numbered STAGEs in FIG. 2, is illustrated in FIG. 4. In the figure, a memory B1 is a pipeline memory for temporarily storing input data B101. As in the memory A1, an order of reading out data from the memory B1 may be different from that of inputting data thereto. Data latches B2 and B3 latch once for every four words of data that is read out of the memory B1. Data latch B4 latches two times for every four words of data that are read out of the memory B1. The selector B5 alternately selects the data outputted from the data latches B2 and B3, and applies it to a multiplier B7. A multiplier memory B18, under address control by a system controller S, inputs multiplier data through a data latch B6 to a multiplier B7. Data latches B8, B9 and B10, a sign inverter B11, and add/subtraction-stop circuits B12, B13 and B130 operate as in the basic arithmetic circuit A. In response to an add/subtraction select signal B111, the output data of the data latch B9 and the output data of the data latch B10 are added together or subtracted one from the other. In response to an add/subtraction-stop signal B121 or B131, the output data of the data latch B9 or the output data of the data latch B10 may be outputted as intact through the adder B14. The data from the data latch B16, which is the multiplication result that is subjected to an addition or a subtraction, is applied to a selector B17. The data as passed through the data latches B4 and B15 is also applied to the selector B17. The selector B17 allows those items of data to alternately pass therethrough.

Figure 5:
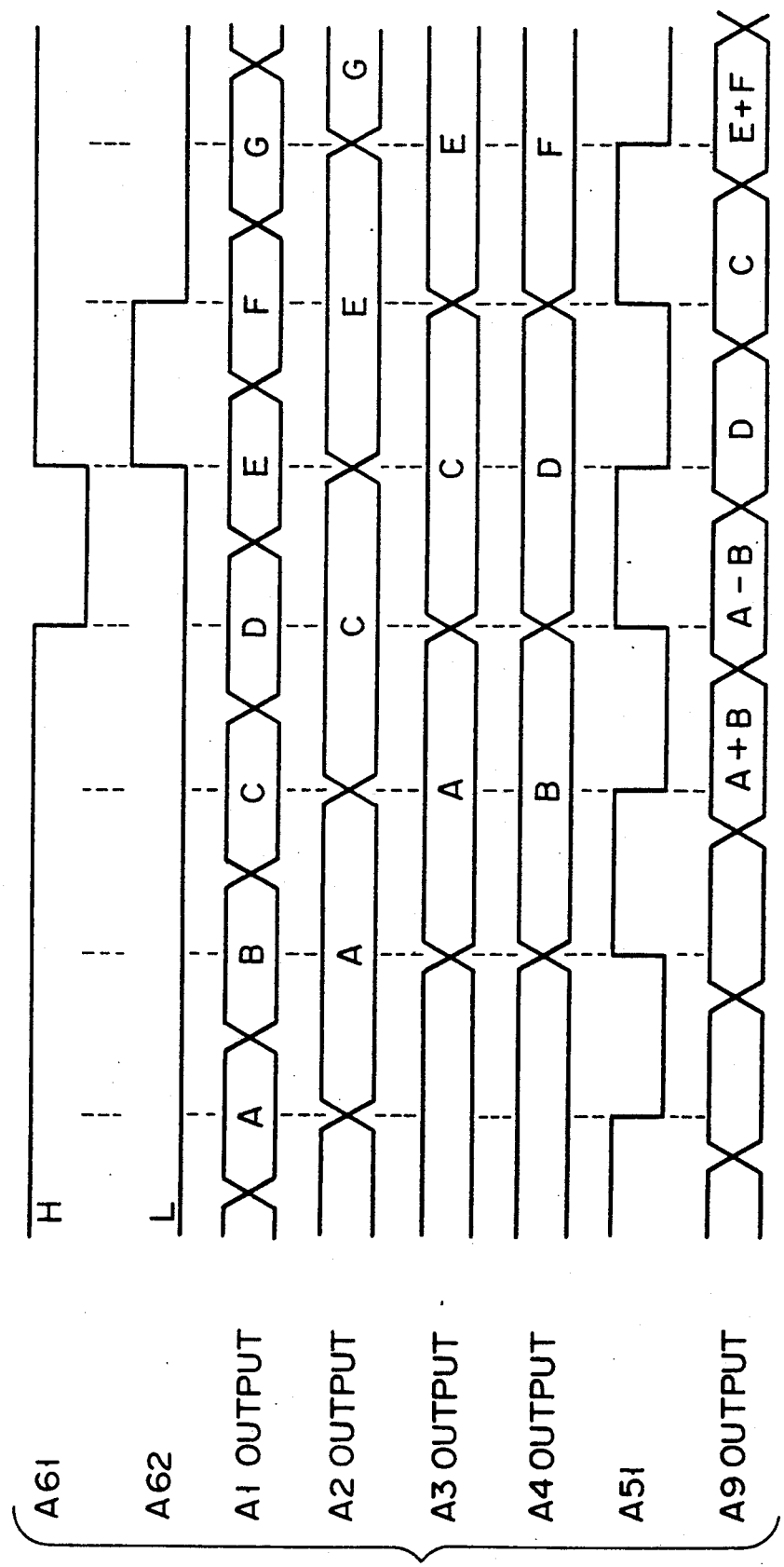
FIGS. 5 and 6 show timing charges for explaining the operations of the FIGS. 3 and 4 circuits.
Figure 6:
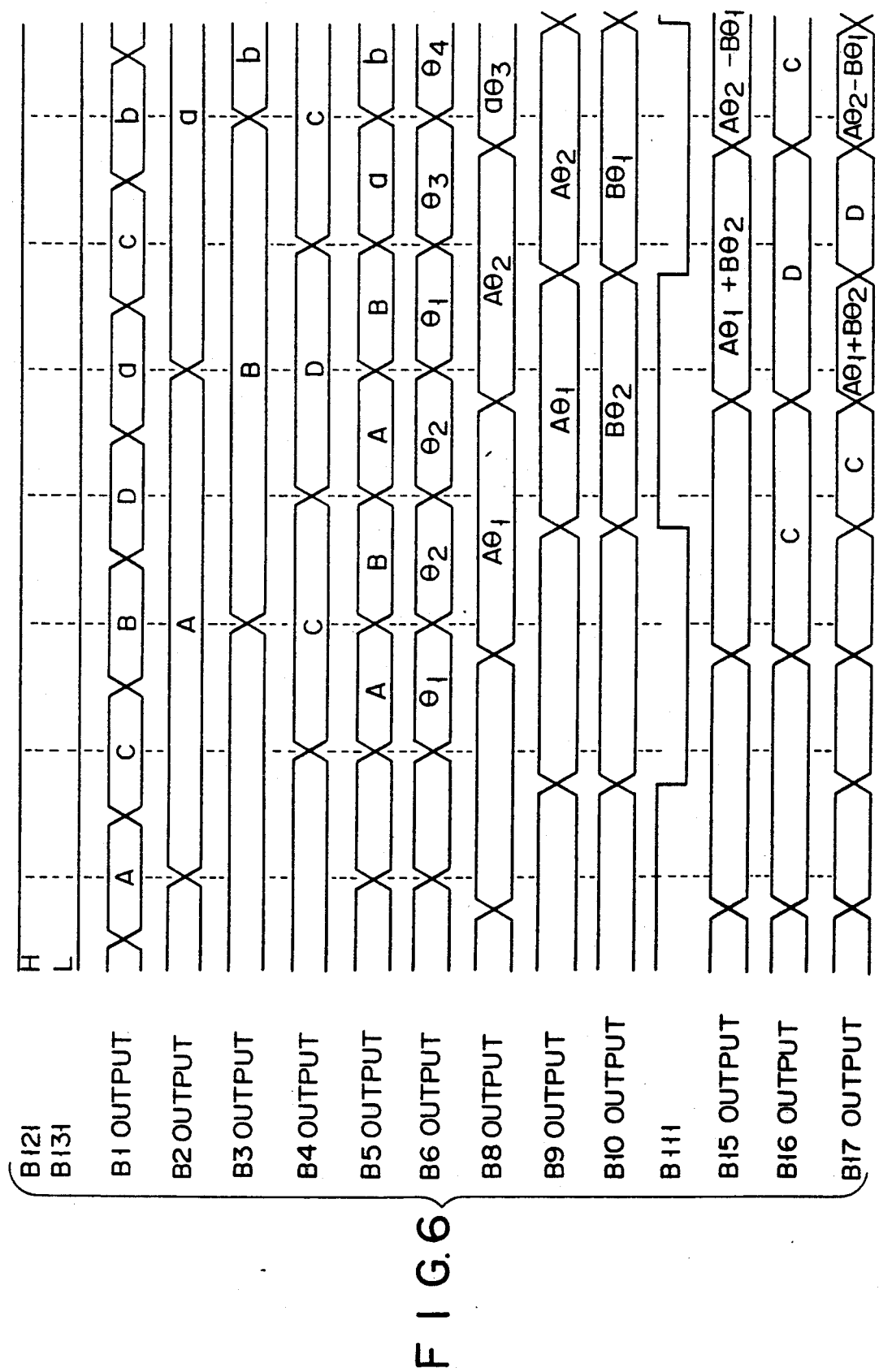

FIGS. 5 and 6 show timing charts useful in explaining the operations of the basic arithmetic circuits A and B as mentioned above, respectively. The system of FIG. 2 may cope with both a discrete cosine transform and its inverse transform with a mere additional hardware for the address control of the multiplier memory 18, and the buffer memories A1 and B, and for select of the add/subtraction step signal, if the multiplier memory B18 contains the multiplication data of the transform and its inverse transform, which are common to the STAGEs II, VIII, IV, and VI. The transform and its inverse transform may also be possible in such a way that although each STAGE does not contain the double amount of multiplication data, a multiplication memory is selectively coupled with those STAGEs II, VIII, IV, and VI. The formula $1/\sqrt{N}$ may be realized by a bit shift or quantization, and therefore it will create no problem in the system operation.

The instance as mentioned above is directed to the 32nd order transform, but the present invention is applicable for a $2^{n+1}$th order transform (n=2, 3, ...).

An operator of KTr shown in FIG. 7A may be modified into an operator as shown in FIG. 7B. An operator of $T_4^1$ shown in FIG. 8A may be modified into an operator as shown in FIG. 8B. If the operators are applied to an algorithm as shown in FIG. 1, the number of multiplications is $N/2 \log 2^{N-1}$ for the Nth order transform. This number of multiplications is equal to or less than that as given by the algorithm, which is the smallest of those as given by other algorithms thus far known. If an apparatus, such as DSP, is used, a very high speed transform can be realized.

As described above, to arrange a discrete cosine transforming apparatus, the basic arithmetic circuits A including adders or subtraction circuits or the basic arithmetic circuits B including multipliers are consecutively connected in a cascade fashion. Therefore, as shown in FIG. 1, if the order of the transform is variable (in this instance, 4th to 36th orders), no problem arises. To change the order of transform, it is only needed that the L-shape arithmetic operation is added to the 4th order circuit.

Figure 9:
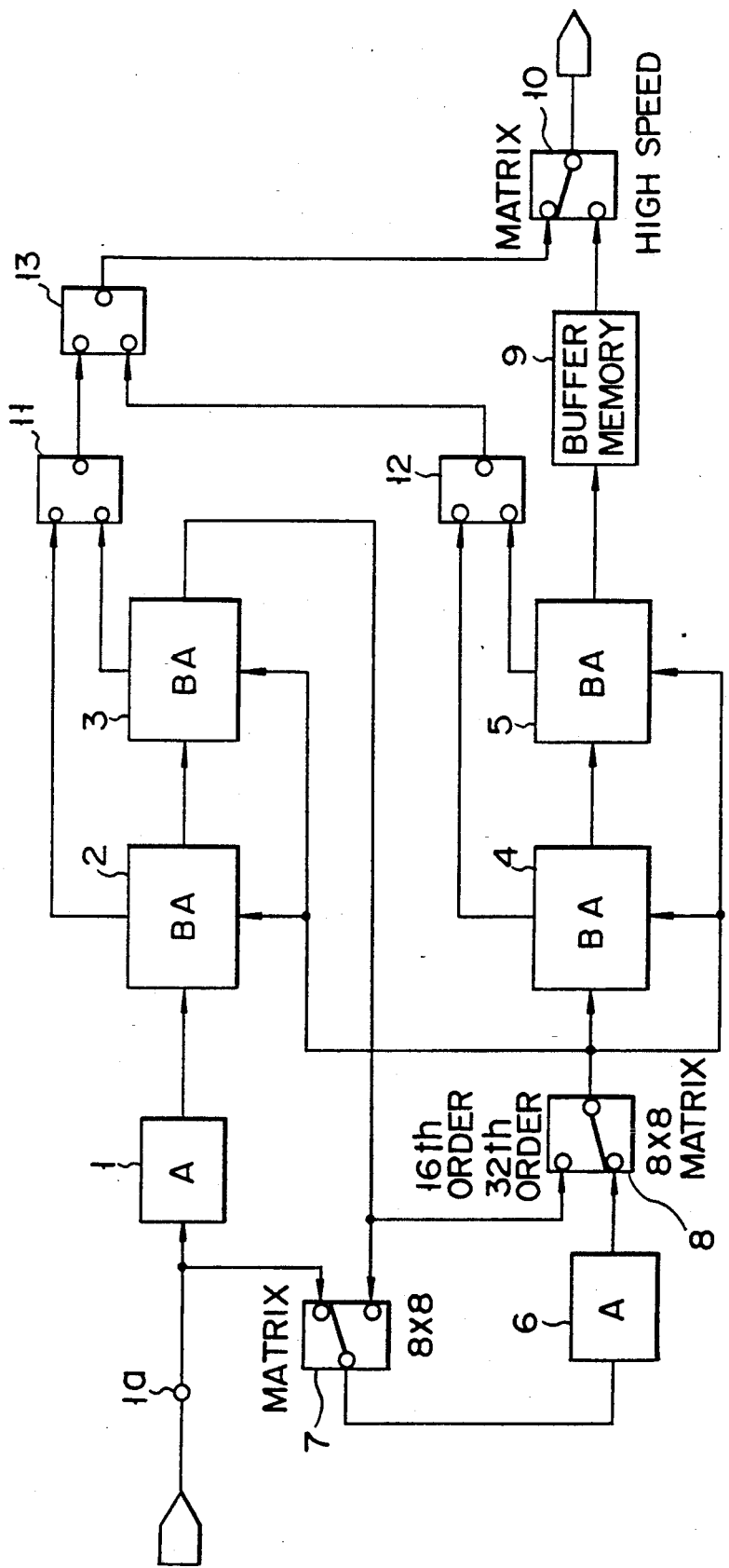
FIG. 9 is a block diagram showing a discrete cosine transforming apparatus according to another embodiment of the present invention.
Figure 10:
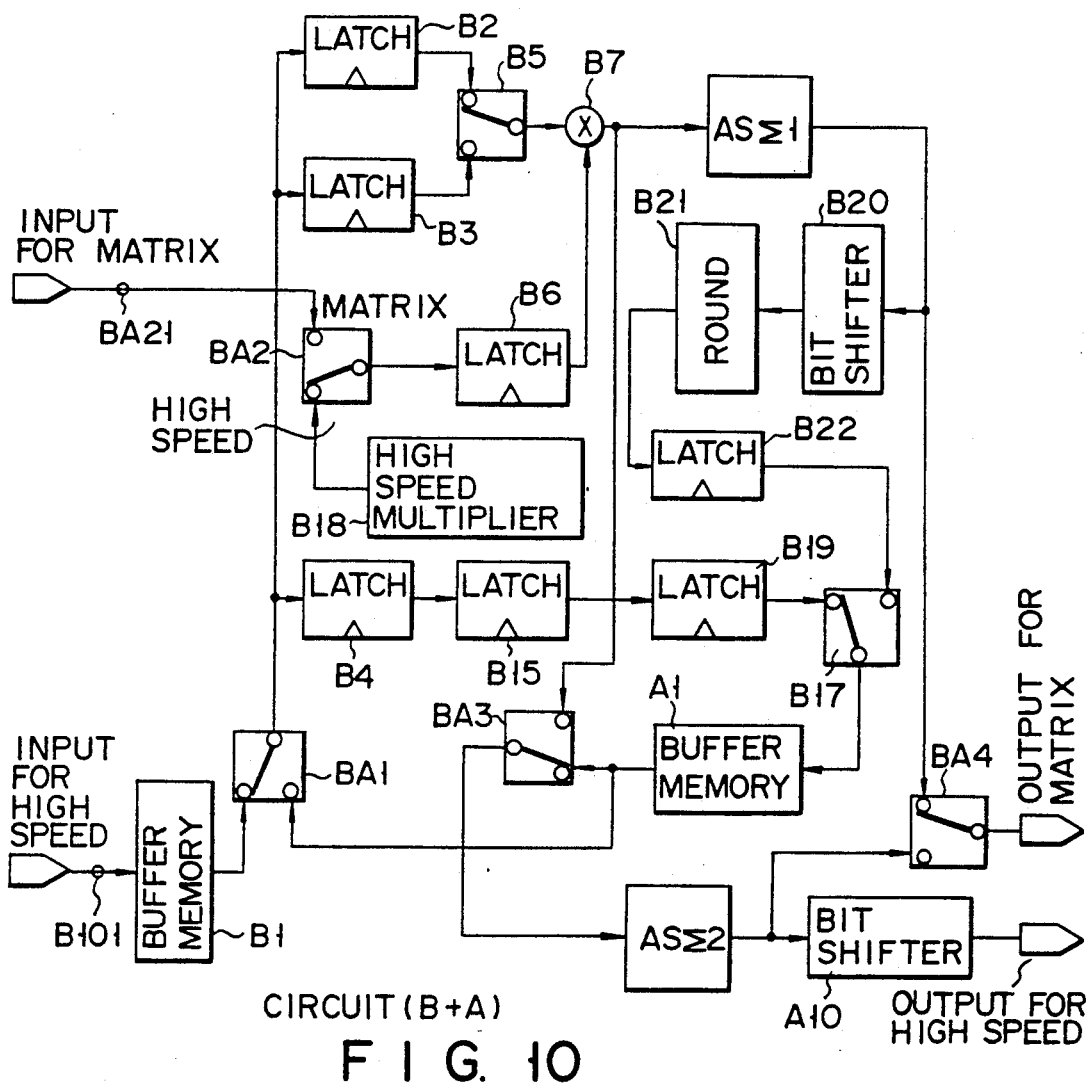
FIGS. 10 and 11 are circuit diagrams showing arithmetic operation circuits used in the FIG. 9 apparatus.

FIG. 9 shows a block diagram of another embodiment of the present invention. A circuit of this embodiment is capable of discrete cosine transforms of the 8th order×8th order, 16th order and 32nd order, and their inverse transforms. In the figure, a circuit BA is a combination of the basic arithmetic circuits B and A as shown in FIG. 10. In this figure, each of bit shifters A10 and B20 halves input data or does not halve the same depending on whether one bit shift is done or not. A round circuit B21 rounds off input data of the fractions to several bits. When the circuit BA operates in accordance with the high speed algorithm shown in FIG. 1, a selector BA1 allows the output data of a memory B1, which temporarily stores input data B101, to go to data latches B2 and B4. A selector BA2 allows the output data of a multiplier memory B18 to go to a data latch B6. A selector BA3 allows the output data of the memory A1 to go to a circuit AS$\Sigma$ 2 serving as a butterfly adder. The output data of the bit shifter 10 serves as high speed arithmetic operation output data, and enters the next STAGE.

Figure 11:
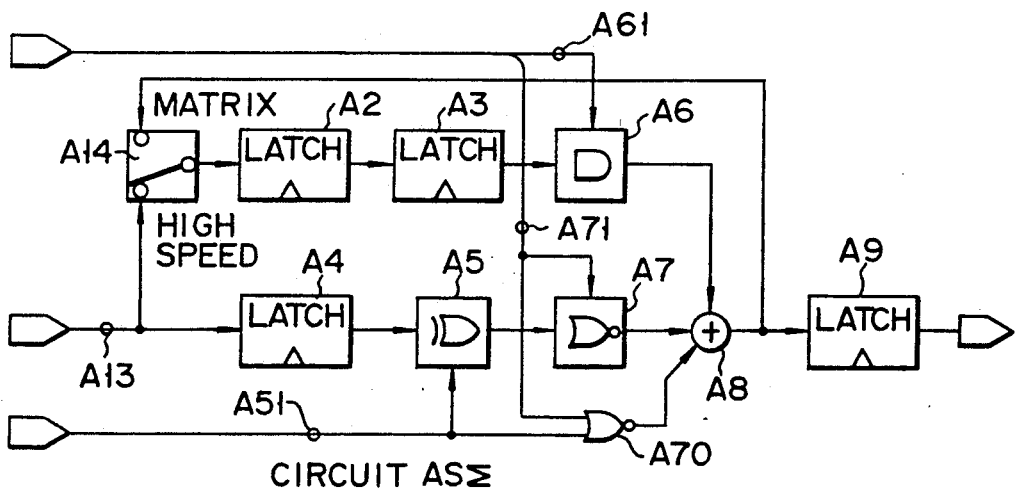

The circuit AS$\Sigma$ is arranged as shown in FIG. 11. A selector A14 applies input data A13 to a data latch A2. The operations at key points in the circuit are substantially the same as those shown in FIGS. 5 and 6.

In FIG. 9, for the discrete cosine transform of the 8th order×8th order and its inverse transform, input data 1a is inputted to a buffer memory 9, by way of a route containing a basic arithmetic circuit A1, circuits (BA)2, 3, selector 7, basic arithmetic circuit (A)6, selector 8, and circuits (BA)4, 5. In this buffer memory 9, the data inputted to the memory 9 is arranged in order, and outputted through the selector 10. For the discrete cosine transform of the 16th order and the 32nd order, and their inverse transforms, the circuit operation is different from that for the 8th order×8th order in that the output data of the circuit (BA)3 is inputted through the selector 8 to the circuit (BA)4. Particularly for the discrete cosine transform of the 16th order, the circuit (BA)2 transfers the input data as intact to the circuit (BA)3. For the inverse cosine transform of the 16th order, the circuit (BA)5 transfers the input data as intact to the buffer memory 9. In this way, the multiplier memory 9 of each circuit BA can be saved. The memories A1 and B1 for temporarily storing the input data and the buffer memory 9 in other basic arithmetic circuits other than circuit (A)6, have each a memory capacity of about 32 words. Since the memory A1 used in the basic arithmetic circuit (A)6 serves as a register memory of the 8th order×8th order, it has a memory capacity of about 64 words.

The circuit of FIG. 9 when it is operated in a matrix operation mode will be described. In this mode, the input data 1a is inputted through the selector 7 to the basic arithmetic circuit (A)6. In a cosine transform mode, the input data is subjected to a butterfly addition in the basic arithmetic circuit (A)6, and is transferred through the selector 8 to an input terminal BA21 for matrix operation of the circuits (BA) 2 to 5. In an inverse cosine transform mode, the input data may be subjected to a matrix operation regardless of the butterfly operation of the input data in the basic arithmetic circuit (A)6. Multipliers for matrix operation are prestored in the memories A1 and B1 of each circuit BA, through a signal line for high speed arithmetic operation. Of the 4th order transform data, two data are outputted in a time division manner from each circuit BA. The data from each circuit BA are arranged into eight items of data through the selectors 11 to 13. The eight items of data are outputted in a time division manner through the selector 10. Thus, the arithmetic operation for the 64th order discrete cosine transform is possible if eight circuits of FIG. 9 are used.

Figure 12A:
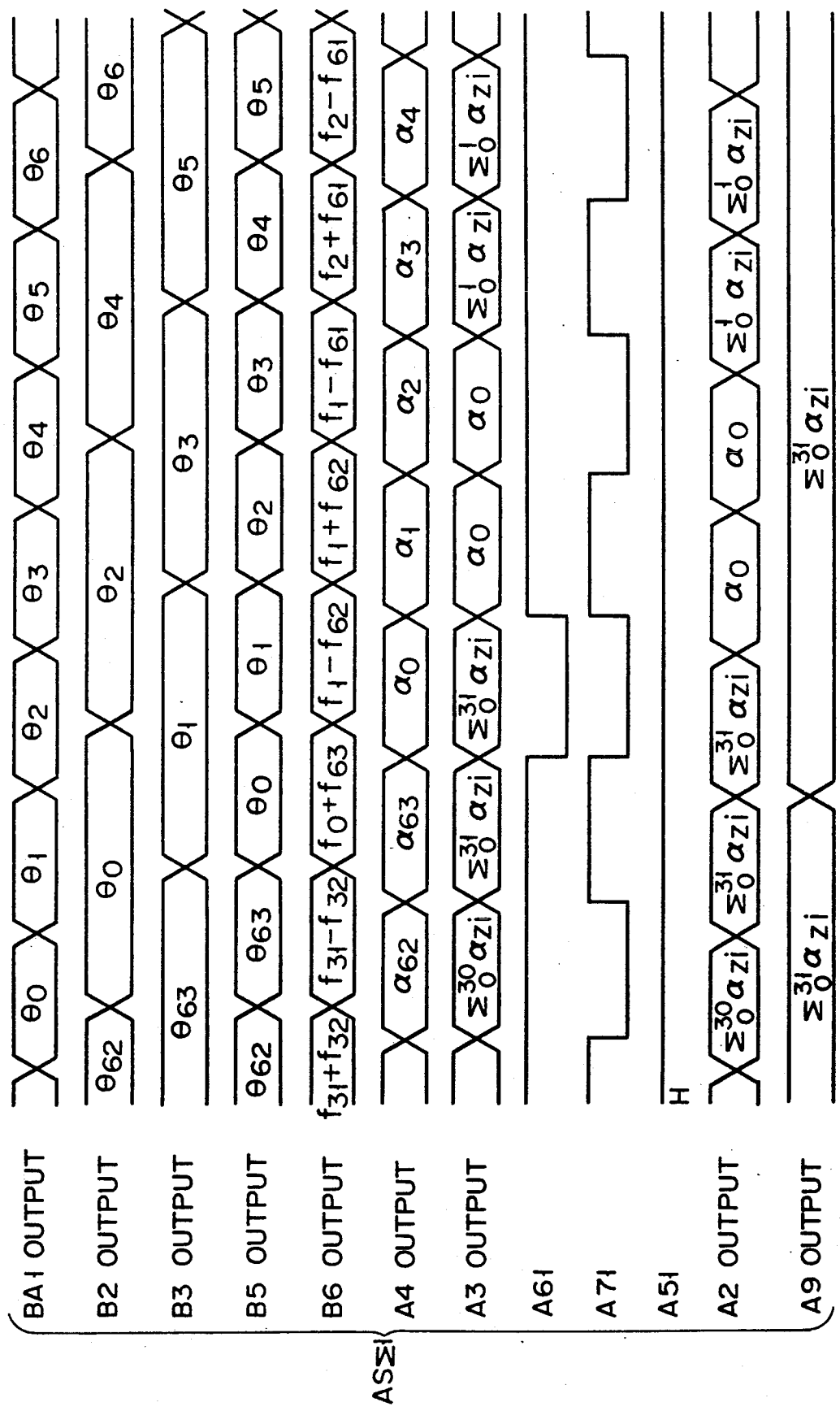
Figure 13A:
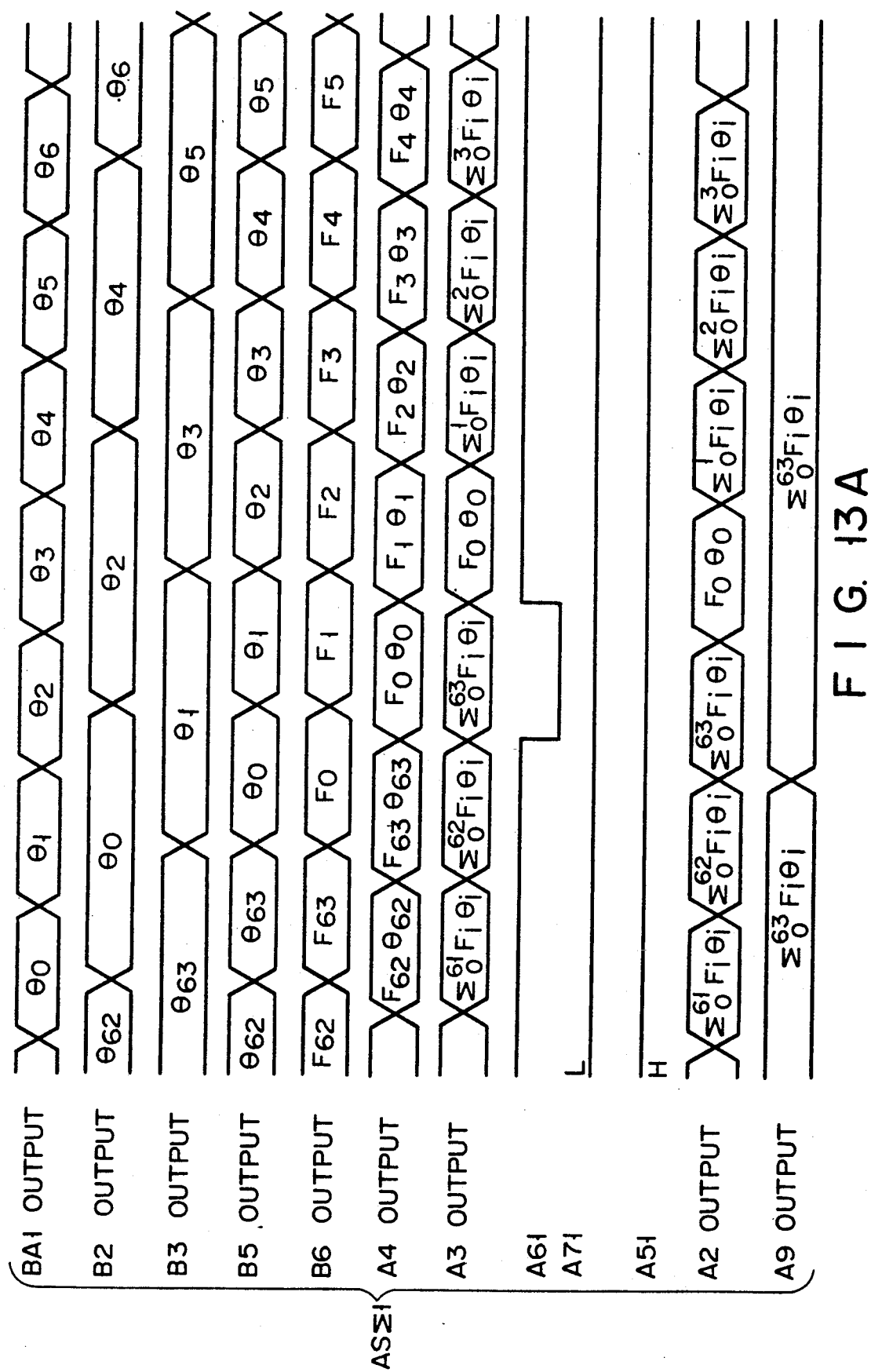

FIGS. 12 and 13 show timing charts for explaining the operations of the circuit shown in block form in FIG. 9, when the circuit is used as a matrix operation circuit, and exercises the 64th order cosine transform and its inverse transform. When comparing the timing charts of FIGS. 12A, 12B, 13A and 13 with those of FIGS. 5 and 6, it will be seen that there is a less number of portions in which a great change of operation is required. Therefore, the control circuit may also be simplified, thereby to readily select the matrix operation or the high speed arithmetic operation.

As seen from the foregoing description, since the present invention is based on a novel high speed algorithm, an arrangement of the basic arithmetic circuits for the discrete cosine transform is exactly the same as for the inverse cosine transform. The number of the basic arithmetic circuits requiring multipliers is "n" for the $2^{n+1}$th order discrete cosine transform. Further, the number of the multiplying operations, which is performed by the basic arithmetic circuit, is smaller than the number of input data. Therefore, the discrete sine transform and its inverse transform can be pipeline processed by a very simple circuit.

Figure 14:
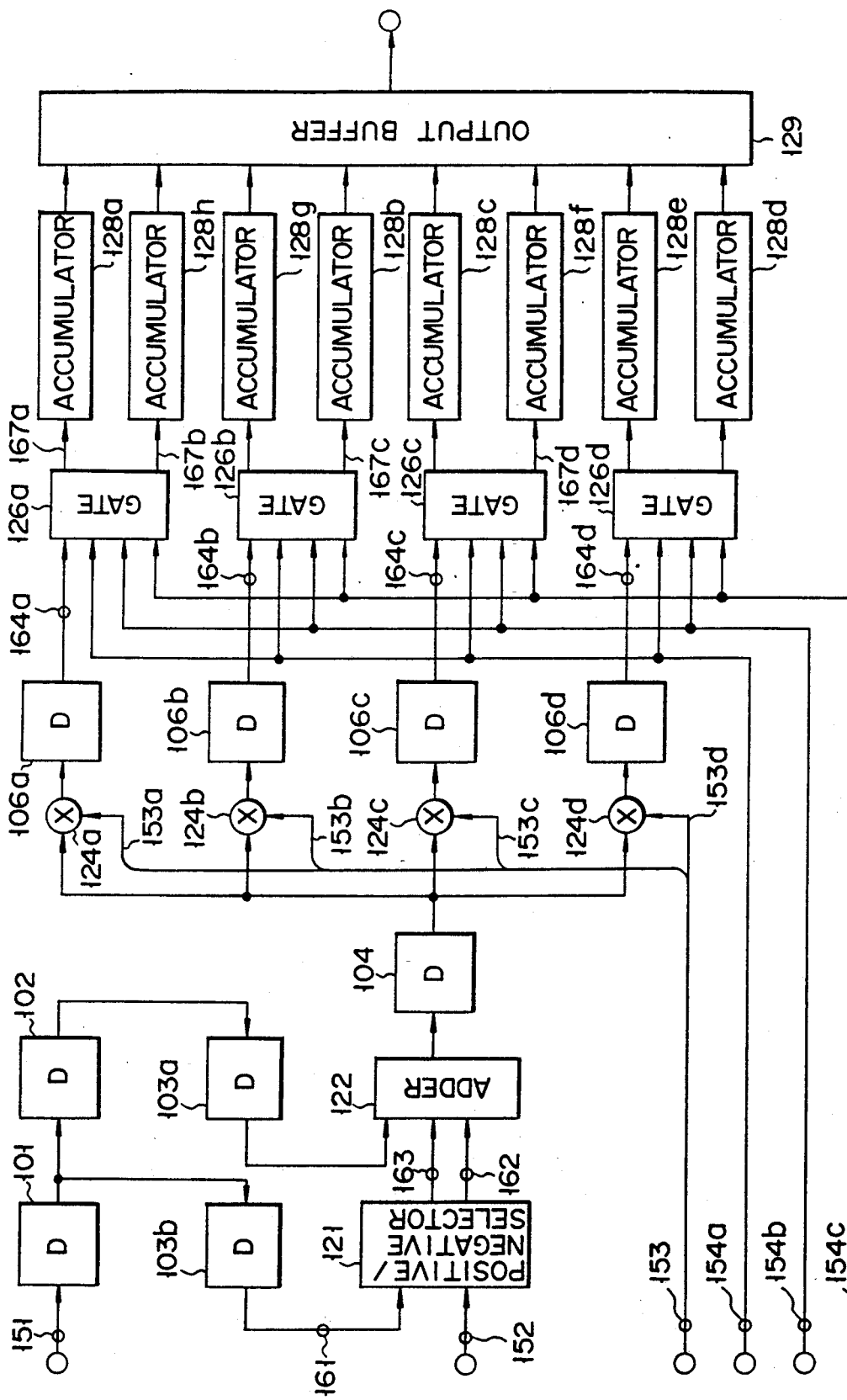
FIG. 14 is a block diagram showing a discrete cosine transforming/inverse transforming apparatus according to another embodiment of the present invention.

FIG. 14 shows a block diagram of an 8th order discrete cosine transforming apparatus according to another embodiment of the present invention.

In the figure, a data latch 101 latches data every time one input data is inputted to the latch 101. A data latch 102 latches the output data of the latch 101 every data. The latch data 103b latches the data that is not latched by the latch 102. A data latch 103a latches the output data of the latch 102 at the same timing as that of a data latch 103b. With such an arrangement, the latch 103a produces the data that is first inputted to the latch 101, while at the same time the latch 103b produces the data that is later inputted to the latch 101.

Figure 15:
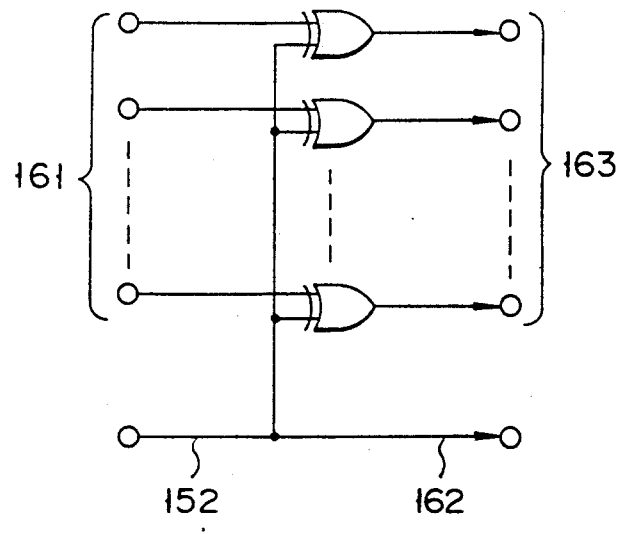
FIG. 15 is a circuit diagram showing a positive/negative (+/−) selector used in the FIG. 14 embodiment.

A positive/negative selector 121 is made up of exclusive OR gates whose number is equal to that of the input data, as shown in FIG. 15. In response to an input signal 152, the selector 121 inverts or does not invert the data outputted from the latch 103b. When the selector 121 inverts the data, it inputs carry data 162 to an adder 122.

The adder 122 adds together the output data of the data latches 103a and 103b, and outputs the result of addition. Accordingly, in accordance with the data of the input signal 152, the adder 122 produces the sum of the output data of the latches 103a and 103b or the difference between them The data latch 104 sequentially latches the difference data or the sum data as outputted from the adder 122, and outputs them to multipliers 124a to 124d.

Multipliers 124a to 124d multiply four different input data 153a to 153d by the output data of a data latch 104, and apply the results of the multiplications to data latches 106a to 106d, respectively.

The data latches 106a to 106d latch the results of the multiplications of the four different data 153 and the output data, and output them to gates 126 (126a to 126d).

Figure 16:
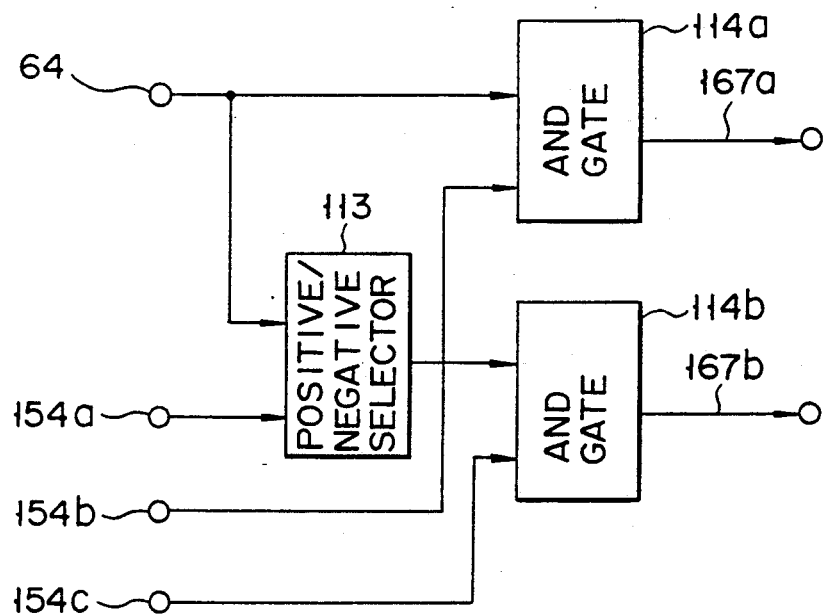
FIG. 16 is a circuit diagram showing a gate circuit used in the FIG. 14 embodiment.
Figure 17:
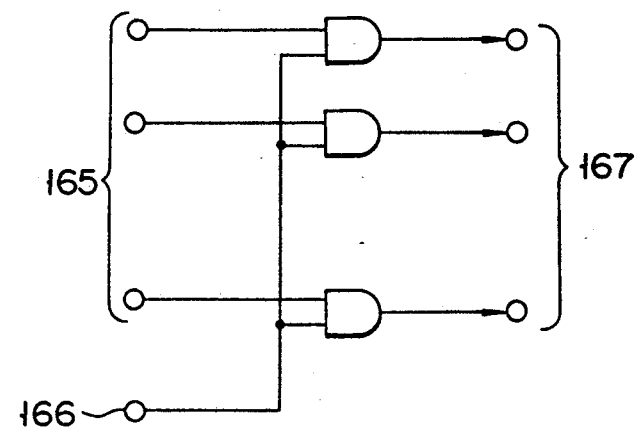
FIG. 17 is a circuit diagram showing an AND gate circuit used in the FIG. 14 embodiment.

The gate circuits 126a to 126d, as shown in FIG. 16, are each made up of a positive/negative selector 113 as shown in FIG. 15, and AND gates as shown in FIG. 17. The output data 167a of the gate circuit 126 is rendered equal to the input data 164 (164a to 164d) or all "0's", in accordance with the data 154b inputted to a terminal 166 shown in FIG. 17. The output data 167b is rendered equal to the input data 164 or the inverted one by the input data 154a. The output data of those gates 126 are respectively transferred to accumulator circuits 128 (128a to 128h). When the circuit 128 is of the fixed-point arithmetic type, the number of input bits of the circuit 128 is larger than that of the output bits of the gate 126 in the upper order bits portion. The data of positive/negative (+/−) sign bits of the gate 126 is applied to the upper bits portion.

FIG. 18 shows a specific arrangement of the accumulator circuit 128. In the circuit, carrier (1) is applied to a carrier input terminal 169 only when the data 164, which is inverted by the latch output, is transferred from the gate 126 to a data input 168.

An arrangement of an output buffer 129 is shown in FIG. 19. As shown, the data that is accumulated and added is latched by a data latch 111, and is outputted to a selector 115. During the next accumulation/addition, the selector 115 sequentially outputs the latch data. Another arrangement of the output buffer 129 is shown in FIG. 20. As shown, the data that is accumulated and added is latched by data latch 111 (111a to 111h). During the next accumulation/addition, switches 116 are operated so that the data in the data latch 111 are sequentially shifted and outputted.

Figure 21:
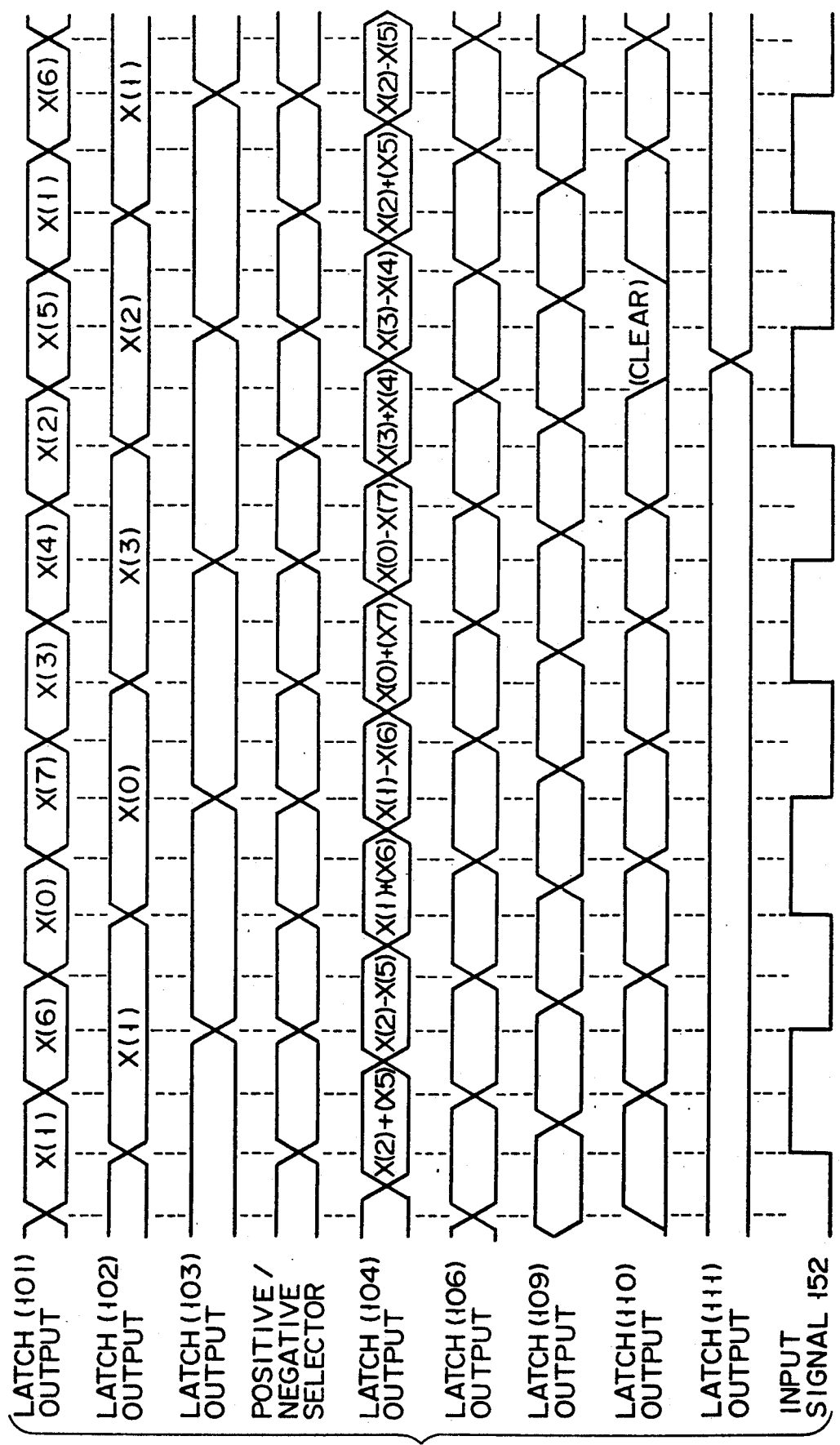
FIG. 21 shows a set of waveforms of signals at key portions of the FIG. 14 embodiment.

An operation of the embodiment of the present invention as mentioned above will be described. Let us a consider a case that data arranged X(0), X(2), ..., X(6), X(7) in this order is subjected to an 8th order cosine transform. If the output data of the data latch 101 is set as shown in FIG. 21, the output data from the data latch 104 is as shown in FIG. 21. The multiplier coefficients shown in FIG. 22 are used as the input data 153 for the output data of the data latch 104. The multiplication result from the multiplier 124 is latched by the data latch 106a. The data shown in FIG. 22 is used as the input data 154 for the multiplication result. When the accumulator circuit 128 accumulates and adds the output data of the gate 126 eight times, eight cosine transform coefficients are obtained.

Figure 23:
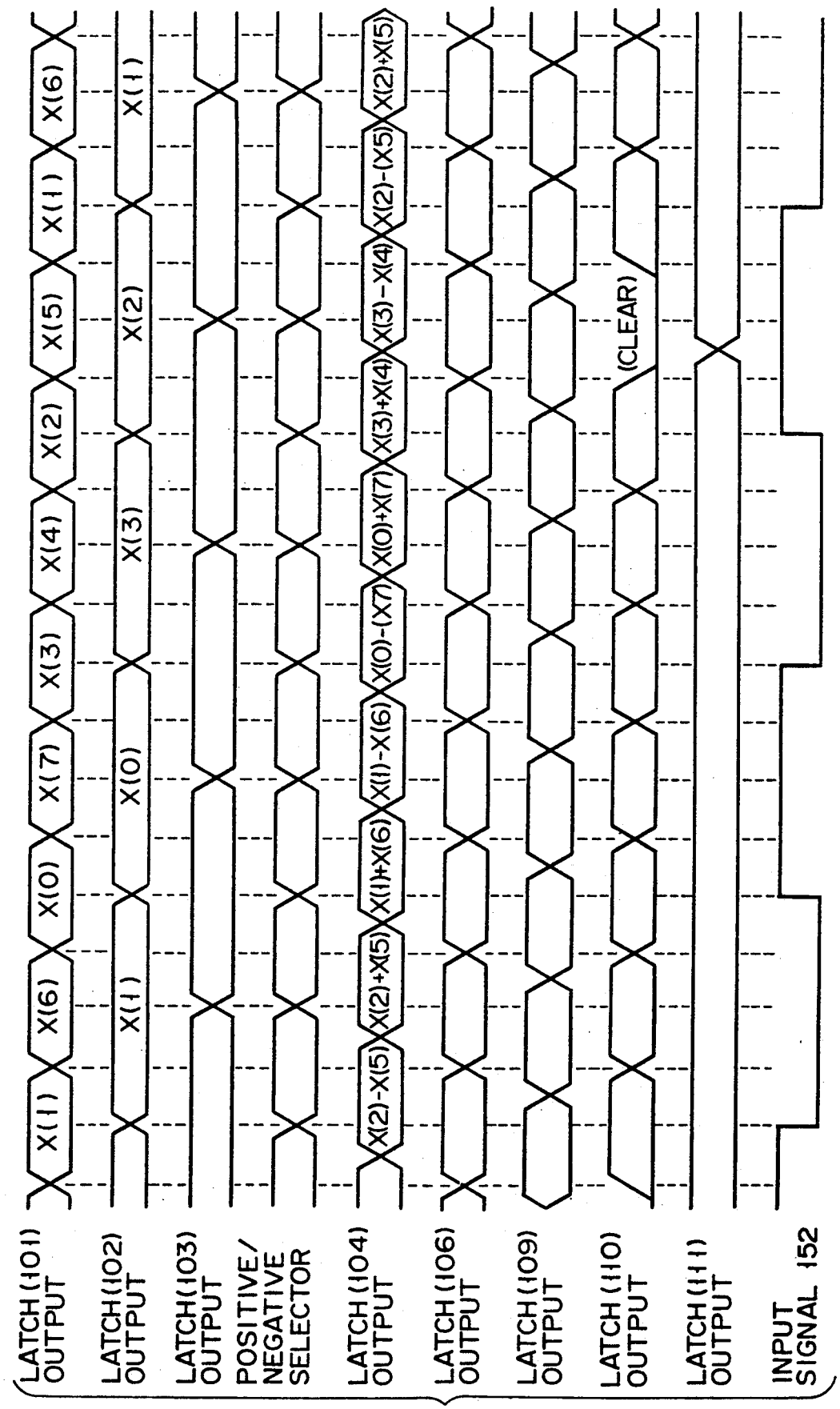
FIG. 23 shows other examples of input data to multiplier and gate circuits of the FIG. 14 embodiment.

Even if the data of the input signal 152 is set as shown in FIG. 23, the cosine transform coefficients can be obtained as in the case of FIG. 21, if the input data 153 for the output data of the data latch 104 and the input data 154 for the multiplication result are set as shown in FIG. 21. When the cosine transform coefficients are arranged U(0), U(1), U(2), ..., U(7) in this order, i.e., from low to high frequency, these data are outputted from the accumulator circuits 128a, 128b, 128c, ..., 128g.

Figure 24:
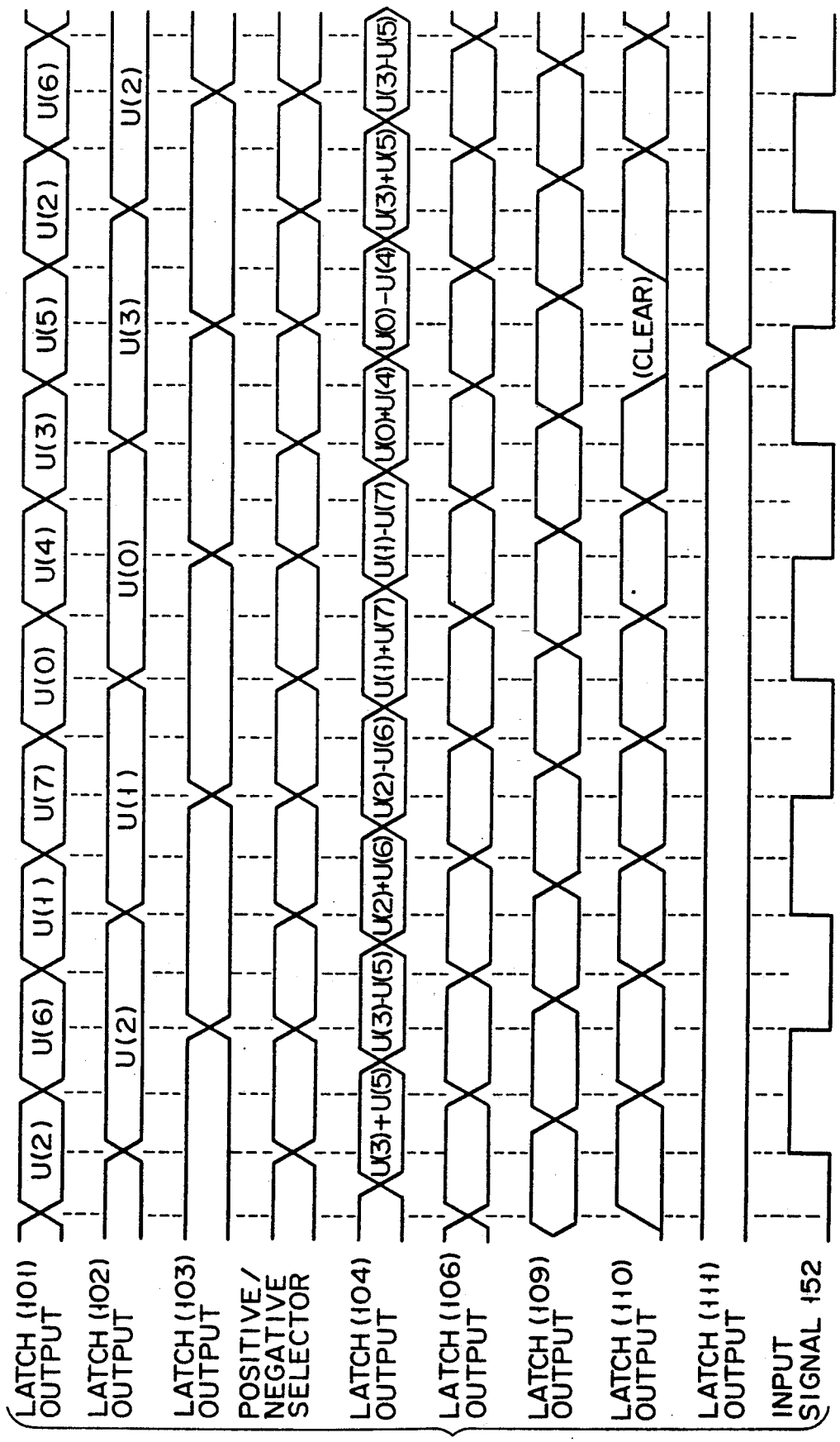
FIG. 24 shows a set of waveforms of signals at key portions of the FIG. 14 embodiment.

Let us consider a case how to inversely cosine transform the cosine transform coefficients. When the cosine transform coefficients are inputted to the data latch 101 in the order as shown in FIG. 24, the latch 104 produces the sums and differences as shown in FIG. 24. To effect the inverse cosine transform, the multiplier coefficients and data as shown in FIG. 25 are used as the input data 153 for the output data of the data latch 104, and as the input data 154 for the multiplication result.

As seen from the foregoing description, the discrete cosine transforming apparatus according to the present invention can exercise the cosine transform and its inverse transform by using the reduced number of multipliers, i.e., half of the number of the multipliers in the conventional matrix operation system.

FIG. 26 shows another embodiment of a discrete cosine transforming apparatus according to the present invention.

In a gate circuit 127 (127a to 127d) as shown in FIG. 27, a positive/negative selector 118 produces input data 171c as it is or inverts the input data and produces the inverted one, in accordance with the contents of input data 156a. A selector 117a selects one of the input data 171a and 171c, and produces the selected one, in accordance with the contents of input data 156b. Another selector 117b selects one of the input data 171b and the output data of the negative/positive selector 118, and outputs the selected one. The input data 171c is the sum of the data 171a and 171b, as shown in FIG. 26.

More specifically, the positive/negative selector 118 shown in FIG. 27 produces the input data 171c as it is, when the input data 156a is "0", and produces inverted input data when it is "1". The selector 117 produces the input data 171a and 171b only when the input data 156b is "0".

Figure 28:
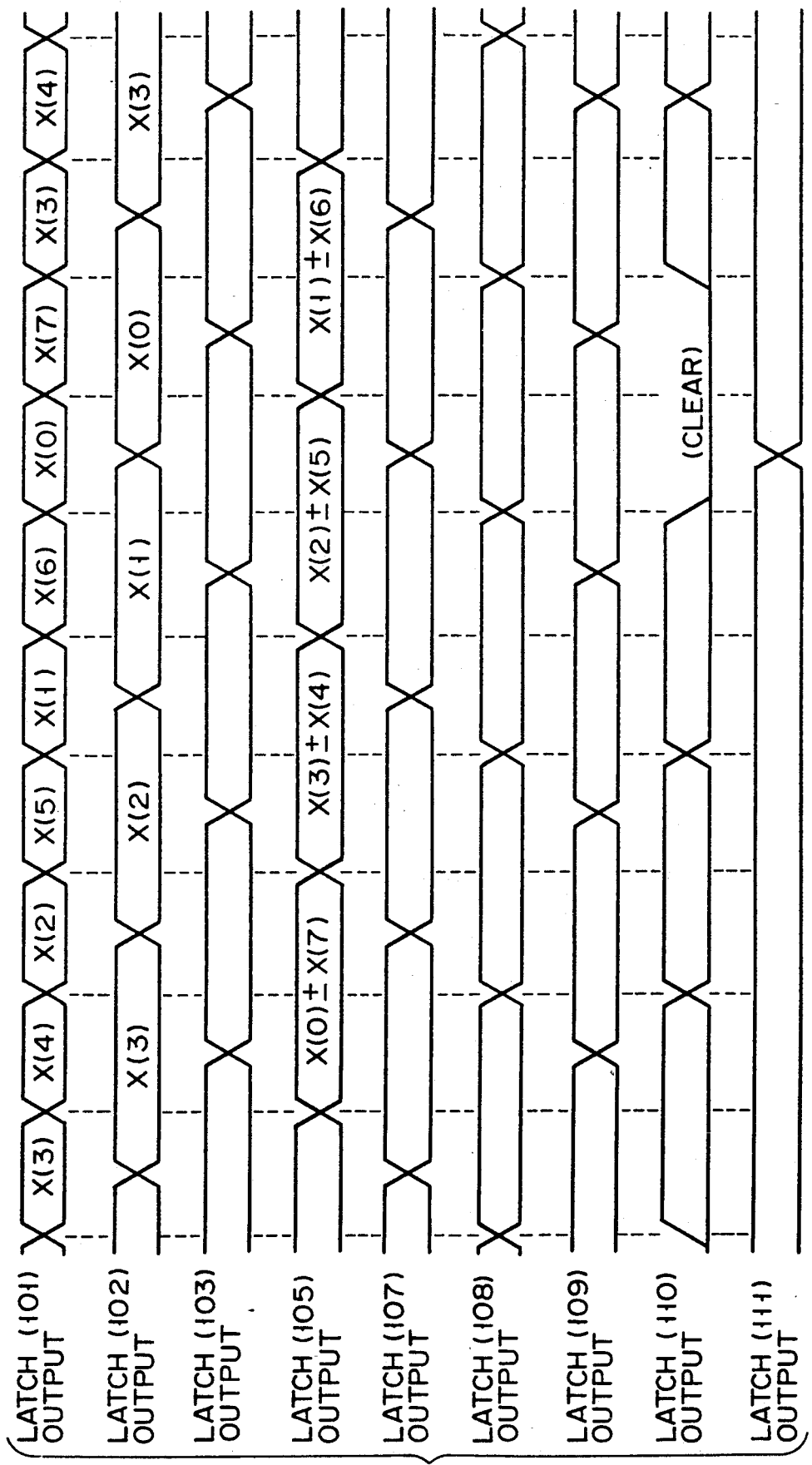
FIG. 28 is a set of waveforms of signals at key portions in the FIG. 26 embodiment.

When image data X are sequentially inputted to data latch 101, as shown in FIG. 28, data latch 105a produces the sum of two items of data, while data latch 105b produces a difference between two items of data. Multiplier coefficients and data shown in FIGS. 29A and 29B are used as input data 155 for the output data of the data latch 105 (105a, 105b) and as the input data 156 for the result of multiplication of those items of data. If so, a cosine transform coefficient U is obtained every time the four output data of data latch 108 are accumulated and added together by an accumulator 128 (128a to 128h), as shown in FIG. 28. Consequently, the accumulator 128 produces cosine transform data U as in the previous embodiment.

Figure 30:
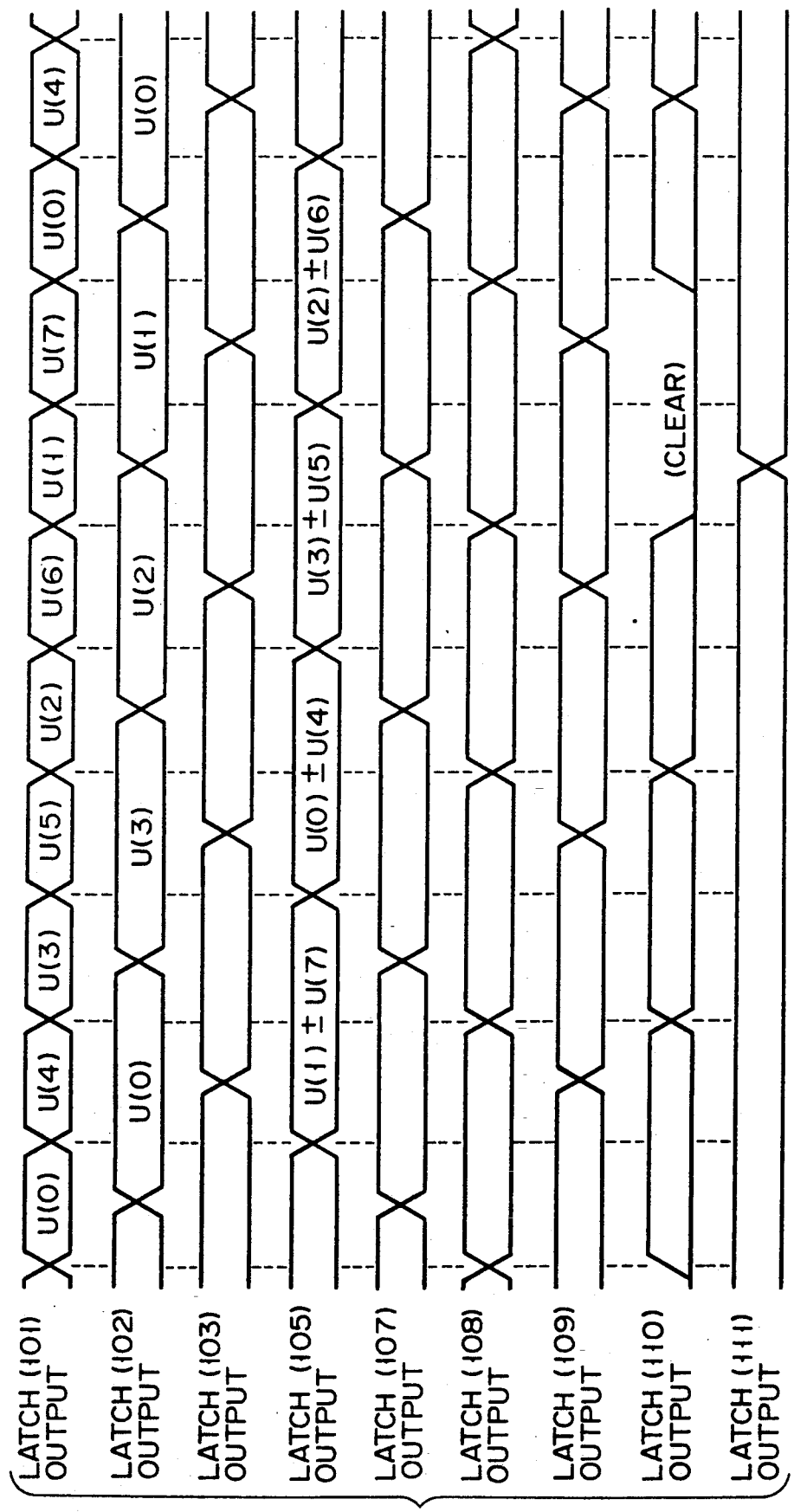
FIG. 30 shows a set of waveforms of signals at key portions of the FIG. 26 embodiment when it is operated in an inverse transform mode.

To inversely transform the cosine transform coefficients, as shown in FIG. 30, the transform data U are sequentially inputted to the data latch 101, and data latch 105a produces the sum of two data, and data latch 105b produces a difference between two data. Multiplier coefficients and data shown in FIGS. 31A and 31B are used as input data 155 for those output data and as the input data 156 for the result of multiplication of those data. If so, the accumulator 128 produces inversely transformed image data X obtained every time the four output data of data latch 108 are accumulated and added together.

As described above, the discrete cosine transforming apparatus according to the present invention uses the same number of the multipliers in the conventional matrix operation system. It is noted, however, that addition, subtraction or multiplication is performed every time two items of data are inputted to the apparatus. This feature indicates that the apparatus of the present invention can receive data and exercise the cosine transform at a speed that is two times that of the conventional matrix operation.

Figure 32:
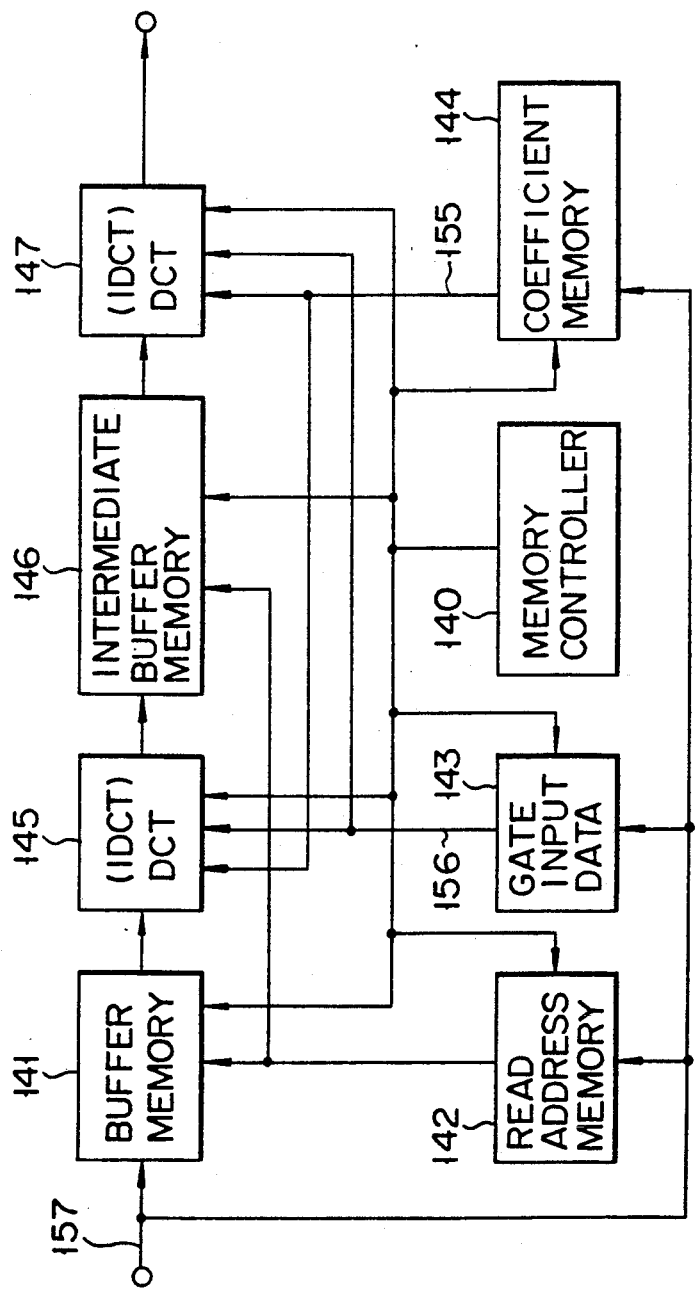
FIG. 32 is a block diagram showing a discrete cosine transforming/inverse transforming apparatus according to another embodiment of the present invention.

FIG. 32 shows a block diagram of an arrangement of an apparatus for exercising a discrete cosine transform of a 2n-th order × 2n-th order and its inverse transform. The apparatus is constructed using the 2n-th cosine transform/inverse transform apparatuses according to the present invention.

The apparatus operates in such a way that a 2n-th order cosine transform/inverse transform apparatus 145 registers transform data of 2n×2n, and a 2n-th order cosine transform/inverse transform apparatus 147 carries out the 2n-th order cosine transform/inverse transform A buffer memory 141 rearranges the input data 157 as are inputted in the order of X(0), ..., X(7) or U(0), ..., (U7), into the data as ordered as shown in FIGS. 28 and 30, and stores the reordered data, and inputs the data into the cosine transform/inverse transform apparatus 145. A buffer memory 146 registers the data of 2n×2n outputted from the cosine transform/inverse transform apparatus 145, and reorders the input data into the data as shown in FIGS. 28 and 30, and inputs the reordered data to the the cosine transform/inverse transform apparatus 147.

The reordering of the input data may be performed in the following way. The address data are prestored in the memory 142 in the order of reading data. A memory controller 140 reads out data from the memory 142, and applies the address data as read out into the read addresses of the memories 141 and 146.

A gate input data memory 143 and a multiplier coefficient memory 144 prestore the data of the cosine transform/inverse transform. The memory controller 140 reads out the data in accordance with the results of arithmetic operation, as shown in FIGS. 29A, 29B, 31A and 31B, thereby to effect the 2n-th order×2n-th order cosine transform/inverse transform.

In the circuit arrangement under discussion, gate input data 156 and the multiplication coefficient data 155 may be common for the two 2n-th order cosine transforms. The peripheral circuit for the cosine transform may be realized with an additional use of only an intermediate buffer memory.

As seen from the foregoing description, in the cosine transforming apparatus of the present invention, the number of multipliers and the number of multiplications is halved. Therefore, the number of the multiplication coefficient data is half of that in the conventional matrix operation. Accordingly, a memory capacity for storage of the multiplication coefficient data is also halved.

The discrete cosine transforming apparatus of the present invention, like the apparatus based on the conventional matrix operation system, is applicable for an orthogonal transform and its inverse transform.

As described above, the discrete cosine transforming apparatus of the present invention may be realized with a simple circuit arrangement like that of the conventional apparatus based on the matrix operation system. Regardless of such features, the number of multipliers may be reduced without damaging the processing speed. Further, the inverse transform may be exercised by using the same circuit.

The discrete cosine transforming apparatus of the present invention may be realized with a simple circuit arrangement and a hardware scale that are comparable with those of the conventional apparatus based on the matrix operation system. Regardless of such features, the apparatus of the present invention may realize a high speed processing, and allows the same circuit to be used for both the cosine transform and its inverse transform.

A coding device to code an output signal outputted from the discrete cosine transforming apparatus will be described with reference to FIG. 33.

Image data is inputted every block to an input terminal 240. The input image data is inputted to a discrete cosine transforming device 201. The device 201 transforms the input image data into discrete cosine transformed (DCT) coefficients data 241. The coefficient data 241 is inputted to an absolute-value circuit 202. In the circuit 202, the data is converted into amplitude data. The amplitude data is applied to a quantizer 203, which in turn produces quantized data 241c. The quantized data is stored into a buffer memory 204. The memory 204 stores positive/negative ($+/-$) sign data 241a and the quantitized data 241b, which are contained in the coefficient data 241.

In a coding mode, data of one block is read out of the buffer memory 204 two times. Of the output data 242 of the buffer memory 204, the $+/-$ sign data 242a is directly applied to a multiplexer 207c. The quantized data 242b is applied to a zero-run-length counter 207a of a corresponding bit plane, and an upper order bit non-zero detector 205 used for the lower order bit plane.

The upper order bit non-zero detector 205 (205a to 205c) is used for checking presence or absence of non-zero in the upper order bits. In this instance, the upper order bit non-zero detector 205a may be arranged so as to directly output the input data. The upper order bit non-zero detectors 205b and 205c may be constructed with 2-input OR gates. Data applied to an input terminal 243 indicates the first time reading of one block data from the buffer memory 204 or the second time reading of the same. In other words, the data indicates whether the coding of coefficiency has been performed or not.

The zero-run-length counter 207a (207a1 to 207a4) counts consecutive 0's in the upper order bits containing non-zero in the data that is first read out of the memory 204. The number of 0's, when the non-zero is detected, is coded by a code table 207b, and it is outputted to a multiplexer 207c. At this time, in the zero-run-length counter 207a, the upper order bit is zero, and therefore, the zero-run-length counter 207a1 is not operated and the multiplexer 207c1 does not produce coded data. Consecutive 0's in the upper order bits part containing "0" in the data resulting from the second time reading from the buffer memory 204, is counted, and when the non-zero is detected, the count is coded by the code table 207b. The coded data and the $+/-$ sign data 242a are successively outputted from the multiplexer 207c.

Figures 34A, 34B:
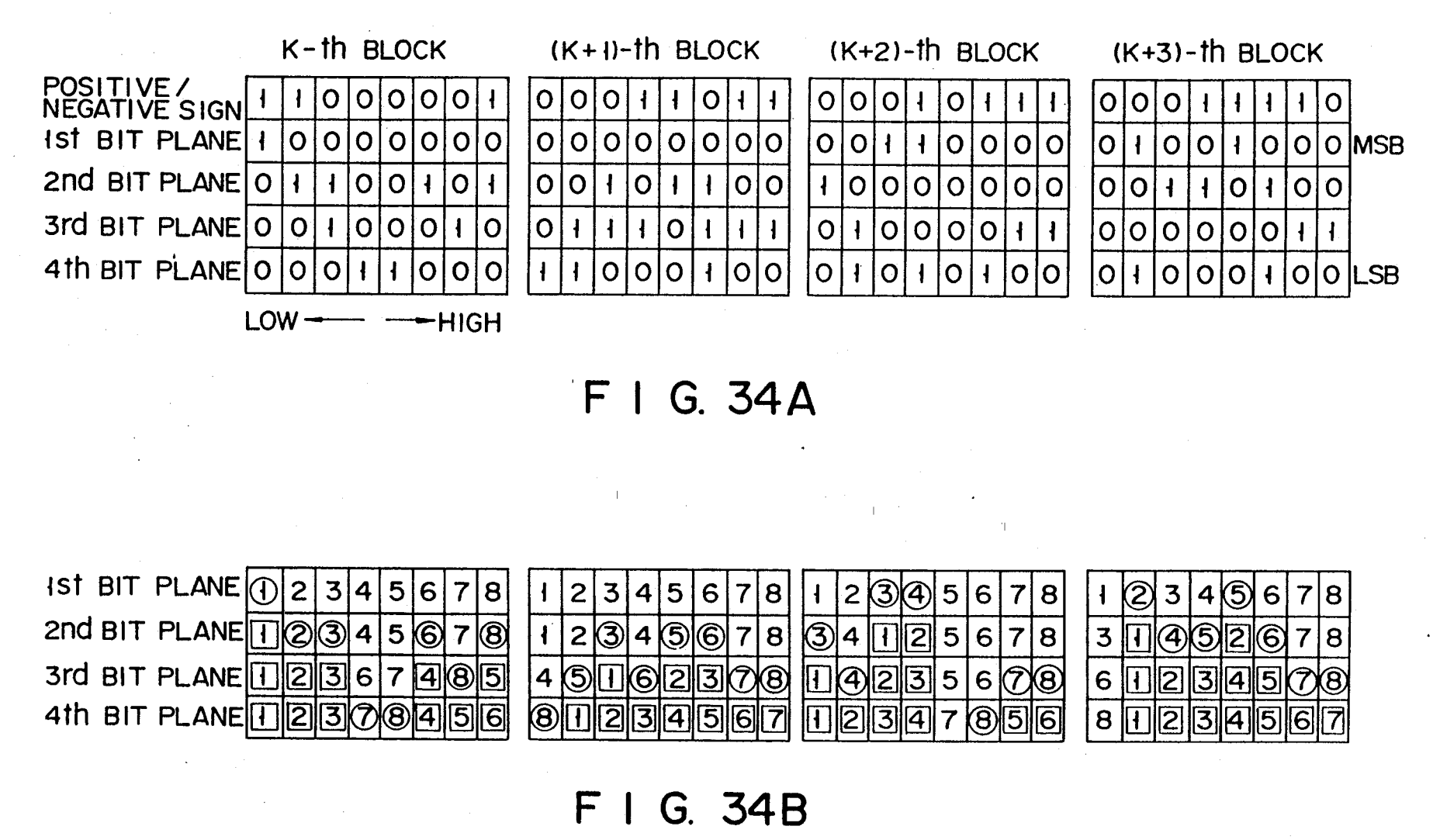

An example of the coding will be described by using actual data. FIGS. 34A and 34B show actual quantized data and an coding order at that time. The $+/-$ signs of only the data of circled figures shown in FIG. 34B are coded. The data thus coded are as shown in FIG. 35. In the figure, Zx indicates coded data whose zero-run length is X; S0, positive ($+$) sign data; S1, negative ($-$) sign data; and E, coded data when the remaining data in the block are all "0's". In FIG. 35, (Zx) indicates the coded data of the zero-run length when the coded data E is not used. For the zero-run length for the data of squared figures in FIG. 34B, when it is coded in a bit-by-bit manner, the coding efficiency is little degraded.

FIG. 36 shows an example of another data coded according to the present coding system. In this example, a coding order of each bit plane is equal to that in the most significant bit plane.

FIG. 37 shows an example of the data whose the $+/-$ sign is also run-length coded. In this example, Zx indicates a run-length code whose zero-run length is X, and Ox indicates a run-length code whose one run-length is X. In this instance, there is a case that no zero-run is present only in the first zero-run-length code of each block. Therefore, the coding efficiency may be improved if the first zero-run-length code, and the second and subsequent zero-run-length code are separated for each block.

FIG. 38 shows an embodiment of a coding device whose hardware scale is smaller than that of FIG. 33. In the circuit, in accordance with the data outputted from an input terminal 244, a bit plane selector 206 sequentially selects and codes the code bit planes in the descending order from the upper order bit plane to the lower order one. Therefore, in the hardware shown, a zero-run-length counter 207h, a code table 207b and a multiplexer 207c may be each single in number, but the number of reading out data of the memory 204 is increased by the number of the bit planes.

Figure 39:
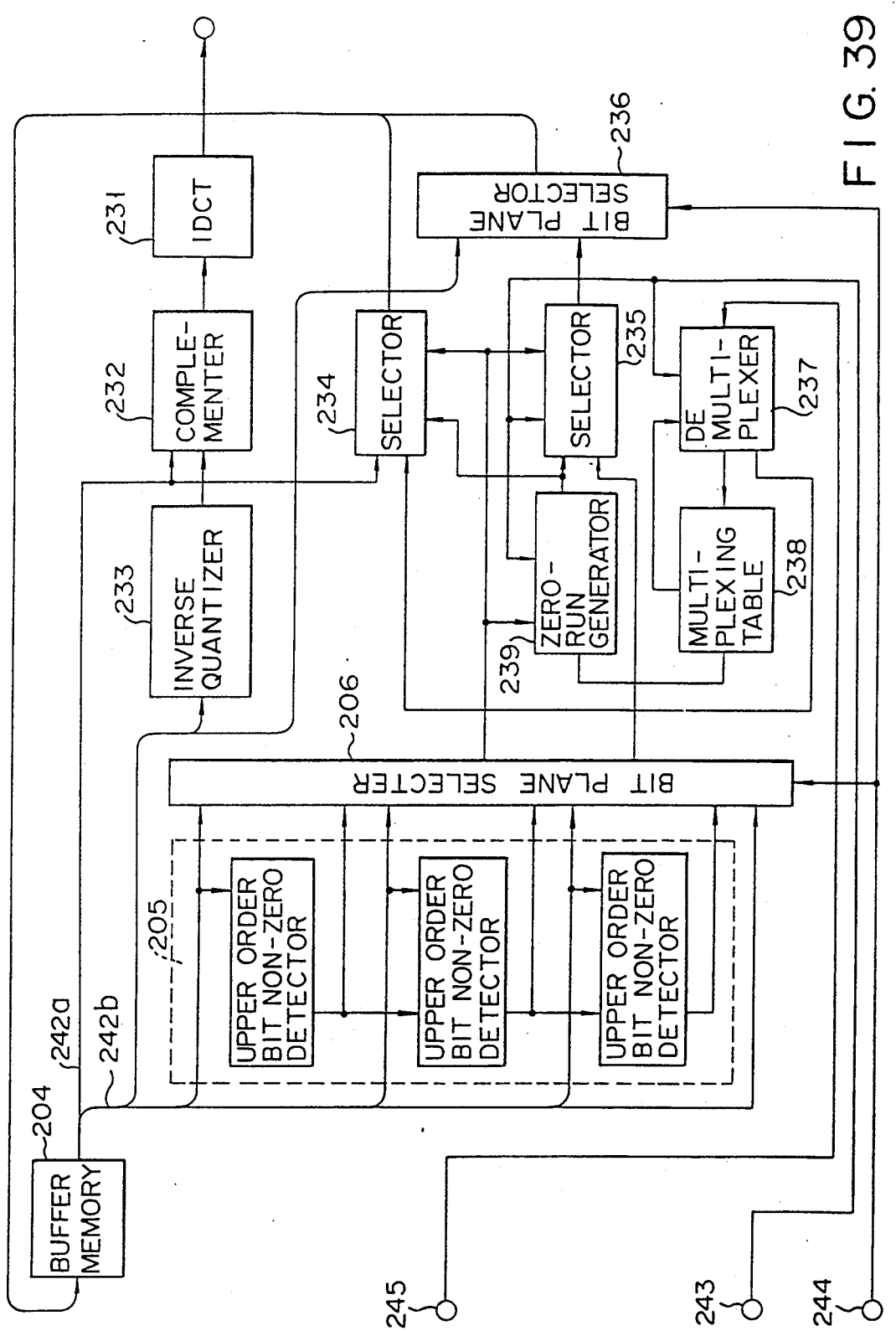
FIG. 39 is a block diagram showing a decoding circuit which implements a decoding system employed in the FIG. 38 device.

FIG. 39 shows an arrangement of a decoding system for the coding system shown in FIG. 33 or 34. Also in this instance, data of one block is read out of the buffer memory 204 for each decode bit plane, consecutively two times. Data appearing at a terminal 243 is data indicating the first time reading of one block data for each decode bit plane or the second time reading of the same, that is, the indicating whether the decoded data corresponds to the data whose upper order bits contain non-zero bit or to the data whose upper order bits are all "0's". Data for selecting the decoded bit planes successively from the upper order bit to the lower order bit, is applied to a terminal 244. Code data of a variable length is segmented into a plurality of data each having a predetermined number of bits, and the segmented data are applied to a terminal 245.

A demultiplexer 237 composes the segmented data and applies the composite one to a decode table 238. The decode table 238 outputs a code length of the variable length code data to the demultiplexer 237.

When the demultiplexer 237 receives the code data corresponding to the data whose upper order bits contain a "0" bit or bits, the data obtained by shifting to the upper order, the data that is lower ordered by the number of bits of the code length, is applied as next input data to the decode table 238 by the demultiplexer 237. When the demultiplexer 237 receives the code data for the data whose upper order bits are all "0's", the data obtained by shifting to the upper order, the data that is lower ordered by one bit plus the number of bits of the code length, is applied as next input data to the decode table 238 for a second time by the demultiplexer 237. At the same time, the demultiplexer applies to the selector 234, the bit data (+/− sign data) that is ordered by one bit higher than the most significant bit inputted to the decode table.

The decode table 238 converts the variable length code data outputted from the demultiplexer 237 into data of a zero-run length, and transfers the converted data to a zero-run generator 239.

The zero-run generator 239 sets the number of zero-runs outputted from the decode table 238 in a down counter, and decreases the data in the down counter every time one bit of the zero data is outputted, and produces non-zero data when the count of the down counter becomes zero. The down counter contained in the zero-run generator 239 is operable only for the data whose upper order bits contain a non-zero bit or bits, when the data of one block is first read out of the buffer memory 204 for each decode bit plane. When the data of one block is next read out of the buffer memory 204, the down counter is operable only for the data whose upper order bits contain non-zero data. In this way, the zero-run generator 239 applies the non-zero bit data to the selector 234 or 235 only when the non-zero bit data is generated.

The selector 234 allows the +/− sign data outputted from the demultiplexer 237 to go to the buffer memory 204, when the data to be decoded is the data whose upper order bits contain no non-zero bit (viz., when the data of one block is read out of the buffer memory 204 for a second time for each decode bit plane), and when it receives new non-zero bit data from the zero-run generator 239. In other situations, the selector returns the +/− sign data from the buffer memory 204 to the buffer memory 204.

The selector 235 transfers the bit data outputted through the bit plane selector 206 from the buffer memory 204 to the bit plane selector 236, when it is the second time that the data of one block is read out of the buffer memory 204 for each decode bit plane, and the data to be decoded is the data whose upper order bits contain non-zero bit data. In other situations, the selector 235 outputs the bit data outputted from the zero-run generator to the bit plane selector 236.

The bit plane selector 236 stores the output data of the selector 235 at the same bit position as that of the buffer memory 204 as is selected by the bit plane selector 206, stores the output data of the buffer memory 204 as it is at the bit position higher than that bit position, and stores zero data at the bit position lower than the bit position of the output data of the memory 204.

The absolute value data of the buffer memory 204 thus decoded is decoded into a sample value by the inverse quantizer 233, and is inputted to the complementer 232. The complementer 232 outputs the +/− sign data from the buffer memory 204 and the amplitude data from the inverse quantizer 233 as positive and negative data to the inverse discrete cosine transforming device 231. The device 231 reproduces the input data in the form of image data.

Figure 40:
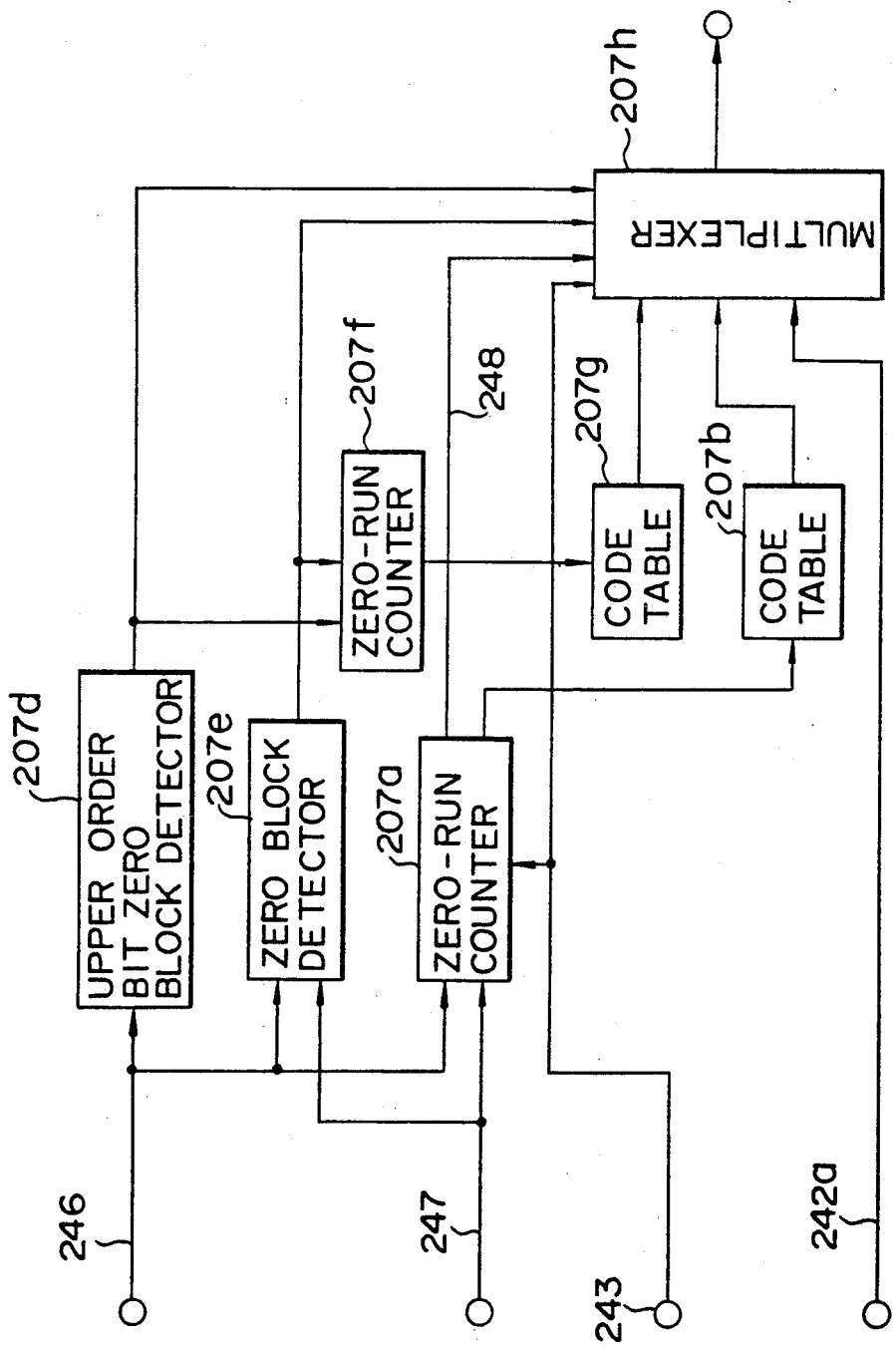
FIG. 40 is a block diagram of yet another coding device.

An additional embodiment of the present invention is equivalent to the run-length encoder 207 of FIG. 38 as is modified as shown in FIG. 40.

An upper order bit zero-block detector 207d outputs zero data to a zero-run counter 207f and a multiplexer 207h when it detects that non-zero bit data is not contained in the bits (higher than the code bit plane) of the block in which data is read out of the buffer memory 204. When detecting that at least one item of the non-zero bit data is at the same bit, the detector 207 produces non-zero data.

A zero block detector 207e outputs zero data to a zero-run-length counter 207f and a multiplexer 207h when it detects that non-zero data is not contained in the bits (higher than the code bit plane) of the block in which data is read out of the buffer memory 204.

Except when receiving the non-zero data from the upper bit zero block detector 207d, a zero block detector 207f counts the number of zero data consecutively outputted from the zero-block detector 207e every time one-block data is read out two times from the upper order zero-block detector 207d for each code bit plane. Then, the detector 207f outputs the consecutive data to a code table 207g.

The code table 207g codes the number of the zero data and outputs it to the multiplexer 207h.

When receiving the zero data from the zero-block detector 207e, the multiplexer 207h does not output code data in the code bit plane for the input block. When receiving zero data from the upper order bit zero-block detector 207d, and non-zero data from the zero-block detector 207e, the multiplexer outputs the code data from the code table 207g before it outputs code data for the first non-zero bit data in the block.

Code data obtained by coding the quantitized data shown in FIG. 34 by the above coding system are shown in FIG. 41. In the figure, Bx indicates that X blocks in which no non-zero bit data ordered higher than the code bit plane exists, are consecutively present, and is the output code data of the code table 207g.

FIG. 42 shows another embodiment of the present invention.

A DC component of the cosine transformed coefficients that is quantized by a quantizer 203, and is applied to a differential PCM arithmetic unit 210 which produces difference data between that DC component and the DC component in the previous block. The difference data is applied to a variable length encoder 211 where it is encoded. The coded data is inputted to a multiplexer 212. An AC component of the output data of the quantizer 203 is applied to a most significant bit detector 208, and is also stored in a buffer memory 204.

The most significant bit detector 208 detects most significant bit plane containing non-zero bit data in one frame, and outputs the position data in the most significant bit plane to a multiplexer 212, a bit plane controller 209, and an address controller 213, when the coding of the DC component is completed.

The bit plane controller 209 first selects the most significant bit plane containing the non-zero bit data in the AC component by using the position data in the most significant bit plane, and outputs data to a bit plane selector 206 so that the lower order bit planes are sequentially selected every time one bit plane is coded.

The address controller 213 determines a maximum number of repetitions of coding the bit plane by using the position data in the most significant bit plane. The address controller 213 controls the addresses of the buffer memory 204 so that the data of one block is read out two times for the coding of one bit plane, and outputs, for each code bit plane, data indicating the first reading or the second reading of one-block data to a run-length coder 207.

As already mentioned, the run-length encoder 207 codes the bit plane of the AC component, and outputs coded data to the multiplexer 212. The multiplexer 212 sequentially combines input variable length codes, and segments it into code data each of a fixed bit length before outputted. Consequently, the upper bit plane not containing non-zero bit data is coded by the start bit plane data. As a result, the coding efficiency is improved.

Figure 43:
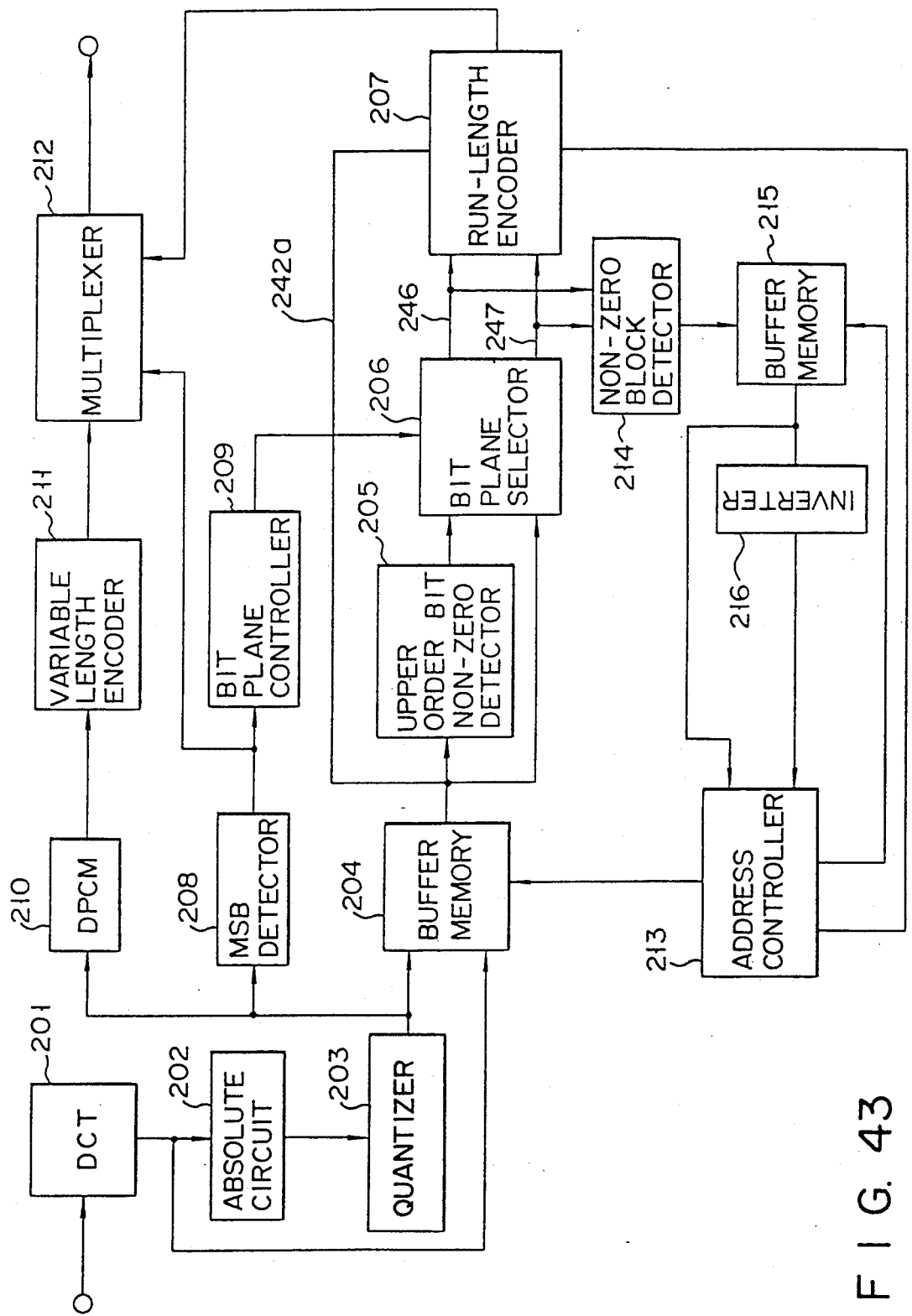

FIG. 43 shows a coding device according to another embodiment of the present invention.

In the figure, a non-zero block detector 214 produces non-zero data if the data block read out of the buffer memory 204 contains more than one item of non-zero data ordered higher than the code bit plane.

An address controller 213 stores the output data of the non-zero block detector 214 in the address of a buffer memory 215 corresponding to the data block that is being read out of the buffer memory 204. When the data is being stored into the buffer memory 204, that is, when CPCM coding progresses, the data of the buffer memory 215 are set to all "0's".

The address control 213 first reads out only the block corresponding to the address of the buffer memory 215 in which non-zero data is stored, from the buffer memory 204, and then it is subjected to the bit plane coding. Then, it inverts again the data of the buffer memory 215 by an inverter 216, and reads out only the block corresponding to the address as non-zero data, and it is subjected to the bit plane coding.

FIG. 44 shows another coding device.

A differential PCM arithmetic unit 210 works out a difference between a quantized value of the DC component and that of the previous block, and outputs it as output data 251 to a variable length encoder 211. The sum of absolute values of the DC component differences between the block located just above the block inputted as image data and each of the blocks located above and below that block and on both sides of that block, is applied as data 252 to a select switch 219. The differential PCM arithmetic unit 210 is shown in FIG. 45. In this instance, a maximum value limiter 210 is provided in order to limit the absolute value sum below a predetermined value. This is done so that in the later processing, a required number of bits is not increased.

An address controller 213 stores the output data of the arithmetic unit 210 into a buffer memory 221 via the switch 219, every time the DC component is CPCM coded.

Upon completion of the DPCM coding, an ordering circuit (for determining the order of coding) 222 sequentially stores into an address memory 223, the data of the buffer memory 221 in the order from large address data to small ones. At the same time, it sets the data of the buffer memory 221 to all "0's".

The address controller 213 reads out address data from the address memory 223 in the order of storing the data into each code bit plane, and reads out the data of blocks corresponding to the address data as read out, from the buffer memory 204, and codes the read out data of the blocks.

In each code bit plane, the address controller 213 stores the output data of the non-zero block detector 214 into the address corresponding to the code block. Also in each code bit plane, the address controller 213, in the order of storing the data into the address memory 223, first detects non-zero data in the buffer memory 221, and codes the blocks corresponding to the addresses. Then the address controller 213 detects zero data in the buffer memory 221, and codes the blocks corresponding to the addresses.

In this way, the blocks probably containing non-zero bit data may be arrayed in a consecutive manner in each code bit plane, and short code data may be used for the address data of the blocks whose non-zero bit data is to be coded. Therefore, the number of code bits may further be reduced. Such blocks that, when the number of code bits is small, a block distortion may occur, are first coded. Therefore, if the coding is stopped before it is completed, degradation of an image quality due to the block distortion can be minimized.

FIG. 46 shows another coding device.

A second quantizer 224 quantizes only the DC component with a larger quantizing value than that of a quantizer 203.

A second inverse quantizer 225 expands a value quantized by the second quantizer 224 to be approximately equal to that quantized by the quantizer 203.

A gate 226 outputs the expanded data to a subtractor 227 only when the data of a DC component is outputted from the quantizer 203, and outputs zero data when the data of an AC component is outputted. In turn, the subtractor 227 outputs for the DC component a quantizing error between the quantizers 224 and 203, while for the AC component, it outputs the output data of the quantizer 203 as intact.

An absolute value circuit 228 converts the output data of the subtractor 227 into an absolute value. An OR gate 229 logically sums a +/− sign derived from a discrete cosine transforming unit 201 and that from the subtractor 227. For the DC component, the absolute value circuit 228 outputs the +/− sign derived from the subtractor 227, while for the AC component, it outputs +/− sign derived from the discrete cosine transforming unit 201. The output data of the absolute value circuit 228 and the OR gate 229 are stored into a one-frame buffer memory 204. Those items of data are coded by a bit plane encoder 230 after the completion of the DPCM coding.

The instant embodiment can code any image data free from such an approach that particularly higher gray level is assigned to the DC component, while particularly lower gray level, to the AC component.

According to the coding device as described above, data distributed in positive and negative domains are converted into absolute values. The absolute value data are coded. In this case, the data in the upper order bit plane is first coded. Only for the data which becomes non-zero in the coded bit plane, the +/− sign data is coded together with the zero-run length code. Therefore, if the coding is stopped before it is completed, degradation of an image quality due to the block distortion can be minimized.

For the blocks containing the data that was non-zero, there is no need for coding the address data of the blocks In this respect, the coding efficiency is improved.

In such a block that its DC component is greatly different from those of the blocks adjacent to it, there is a high possibility that the non-zero bit data exists in the upper order bit plane. Therefore, the block of large DC component difference is first coded, so that the blocks containing the non-zero bit data are consecutively coded, and a frequency of using long codes for the address data of the block is minimized.

Additional advantages and modifications will readily occur to those skilled in the art. Therefore, the invention in its broader aspects is not limited to the specific details, representative apparatus shown and described.

Accordingly, departures may be made from such details without departing from the spirit or scope of the general inventive concept as defined by the appended claims and their equivalents.

What is claimed is:

1. A bit plane coding apparatus, comprising:
means for transforming image data into a plurality of absolute value data with positive/negative sign bit;
means for storing the absolute value data with the positive/negative sign bit;
means for reading out, from said storing means, the absolute value data as a plurality of bit planes arranged in order of a most significant bit plane to a least significant bit plane and including at least one bit run length; and
means for coding the bit planes form the most significant bit plane to the least significant bit plane to output a coded bit plane, said coding means coding a bit plane to be coded only by coding the bit run length, when a coded bit plane upper to the bit plane to be coded has a coded positive/negative sign bit data, and coding the bit plane to be coded by coding the bit run length together with the positive/negative sign data when the coded upper bit plane has no coded positive/negative sign bit data.

2. The bit plane coding apparatus according to claim 1, wherein said coding means includes means for detecting whether a non-zero bit is included in the bit plane upper to the bit plane to be coded, and means for coding the bit plane to be coded by coding the bit run length together with the positive/negative sign bit data when the bit plane upper to the bit plane to be coded includes a non-zero bit.

3. The bit plane coding apparatus according to claim 2, wherein said coding means includes a non-zero detecting means for detecting a non-zero bit from each of the bit planes, counter means for counting zero bits included in the upper bit plane, and code table means for coding a count value obtained by said counting means.

4. A bit plane coding method comprising the steps of:
orthogonal-transforming image data to obtain a plurality of blocks each including a plurality of bit planes formed of coefficient data;
transforming the bit planes of coefficient data into a plurality of absolute value bit planes formed of absolute value data with positive/negative sign bit data, said absolute value bit planes being arranged in order of a most significant bit plane to a least significant bit plane, and including at least one bit run length;
performing the following coding steps on at least one of the blocks which has an upper order absolute value bit plane containing non-zero coefficient data wherein a sign bit is coded, to obtain a coded bit plane:
coding at least one of the absolute value bit planes only by coding the bit run length when the coded bit plane of the upper order to the absolute bit plane to be coded has a coded positive/negative sign bit data, and
coding at least one of the absolute bit planes by coding the bit run length together with the positive/negative sign bit data when the coded bit plane of the upper order to the absolute value bit plane to be coded has no coded positive/negative sign bit data; and
performing the following coding steps for the absolute value bit planes of at least one of the blocks which has an upper order absolute bit plane containing non-zero coefficient data wherein a sign bit is not coded, to obtain a coded bit plane:
coding a bit run length of at least one of the blocks containing non-zero coefficient data wherein a sign bit is not coded, except for a block having an upper order absolute value bit plane containing non-zero coefficient data wherein the sign bit is coded, and
coding at least one of the absolute value bit planes by coding the bit run length together with the positive/negative sign bit data when the coded bit plane of the upper order to the absolute bit plane has no coded positive/negative sign bit.

5. The bit plane coding method according to claim 4, which includes, after coding of all DC components contained in discrete cosine transformed coefficient data for each of the blocks and sorting the blocks into an order of magnitude of a sum of absolute values of DC component difference between adjacent ones of the blocks, a step of coding AC components of the coefficients of each of the blocks.

* * * * *